US012785193B2

(12) United States Patent
Haupt et al.

(10) Patent No.: US 12,785,193 B2
(45) Date of Patent: Nov. 3, 2026

(54) BATTERY CASE ASSEMBLY

(71) Applicants: NISSAN NORTH AMERICA, INC., Franklin, TN (US); NISSAN MOTOR CO., LTD., Yokohama (JP)

(72) Inventors: Brian Christopher Haupt, Farmington Hills, MI (US); Kayla Schmidt, West Bloomfield, MI (US); Do Huy Duc, Atsugi (JP); Daisuke Iiduka, Atsugi (JP)

(73) Assignees: NISSAN NORTH AMERICA, INC., Franklin, TN (US); NISSAN MOTOR CO., LTD., Yokohama (JP)

( * ) Notice: Subject to any disclaimer, the term of this patent is extended or adjusted under 35 U.S.C. 154(b) by 778 days.

(21) Appl. No.: 17/979,608

(22) Filed: Nov. 2, 2022

(65) Prior Publication Data

US 2024/0145837 A1 May 2, 2024

(51) Int. Cl.

*H01M 50/249* (2021.01)
*B60K 1/04* (2019.01)
*B62D 25/20* (2006.01)

(52) U.S. Cl.

CPC ............. *H01M 50/249* (2021.01); *B60K 1/04* (2013.01); *B62D 25/2009* (2013.01); *B60K 2001/0427* (2013.01)

(58) Field of Classification Search

CPC ................... H01M 50/249; B60K 1/04; B60K 2001/0427; B62D 25/2009

See application file for complete search history.

(56) References Cited

U.S. PATENT DOCUMENTS

| | | | | |
|---|---|---|---|---|
| 7,048,321 | B2 * | 5/2006 | Bandoh | B60R 16/0239 180/68.5 |
| 8,770,331 | B2 | 7/2014 | Lim et al. | |
| 9,012,056 | B2 * | 4/2015 | Lim | B60L 50/64 429/120 |
| 2008/0047767 | A1 | 2/2008 | Tsuchiya | |
| 2017/0288284 | A1 * | 10/2017 | Iguchi | H01M 10/6556 |

FOREIGN PATENT DOCUMENTS

| | | |
|---|---|---|
| JP | 6593704 B2 | 10/2019 |

* cited by examiner

*Primary Examiner* — James A Shriver, II
*Assistant Examiner* — Nicholas R. Kandas
(74) *Attorney, Agent, or Firm* — Spencer Fane, LLP

(57) ABSTRACT

A battery case assembly includes a first member and a second member. The first member has a bottom portion, an upright portion and a top portion. The bottom portion is rigidly and fixedly attached to a vehicle floor structure. The second member is attached to the first member thereby defining a hollow rectangular structure with an open forward end and an open rearward end. A battery fitted within the hollow rectangular structure such that forward end of the battery is exposed via the open forward end of the hollow rectangular structure and a rearward end of the battery is exposed via the open rearward end of the hollow rectangular structure.

19 Claims, 37 Drawing Sheets

BATTERY CASE ASSEMBLY

BACKGROUND

Technical Field

The present disclosure generally relates to a battery case assembly. More specifically, the present disclosure relates to a battery case assembly that retains a secondary battery within the passenger compartment of a vehicle concealed by a center console assembly.

Background Information

As vehicles become more electronically complex, a need has developed for protecting some portions of vehicle electronics against low voltage and low amperage situations caused by, for example, main battery failure. Some vehicles now include a backup battery or secondary battery that maintains a constant voltage and constant amperage to electronic components of a vehicle regardless of the condition of the main battery.

SUMMARY

One object of the present disclosure is to provide a secondary battery with a protective structure within the vehicle.

In view of the state of the known technology, one aspect of the present disclosure is to provide a battery case assembly with a first member having a bottom portion, an upright portion and a top portion. The bottom portion is fixedly attached to a vehicle floor structure. A second member is attached to the first member such that the first member and the second member define a hollow rectangular structure. A bottom portion, an upright portion and the top portion of the first member define three sides of the hollow rectangular structure and an upright section of the second member defining a fourth side of the hollow rectangular structure. The hollow rectangular structure has an open forward end and an open rearward end. A battery is fitted within the hollow rectangular structure such that forward end of the battery is exposed via the open forward end of the hollow rectangular structure and a rearward end of the battery is exposed via the open rearward end of the hollow rectangular structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
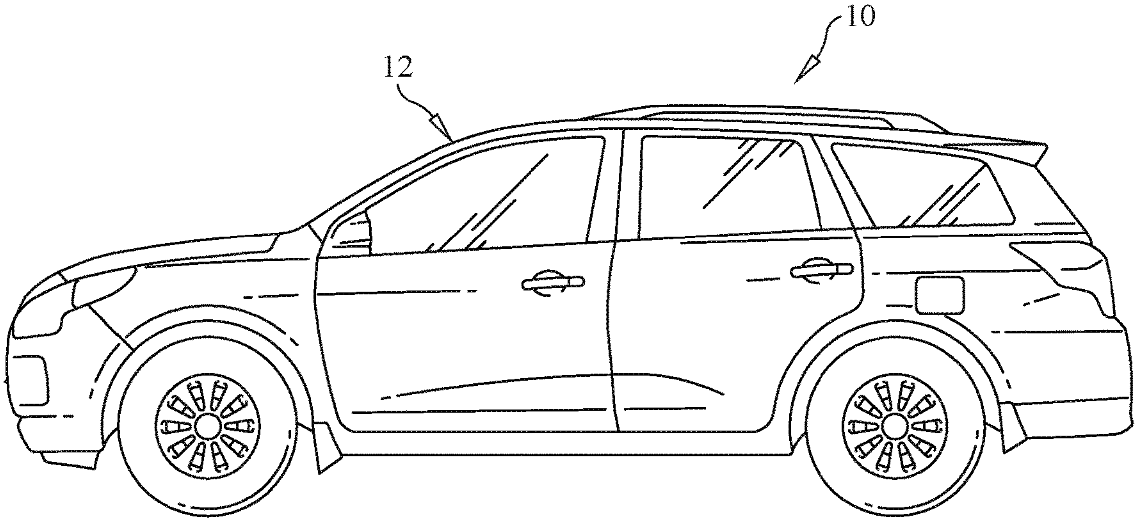
FIG. 1 is a side view of a vehicle having a passenger compartment in accordance with an exemplary embodiment.
Figure 2:
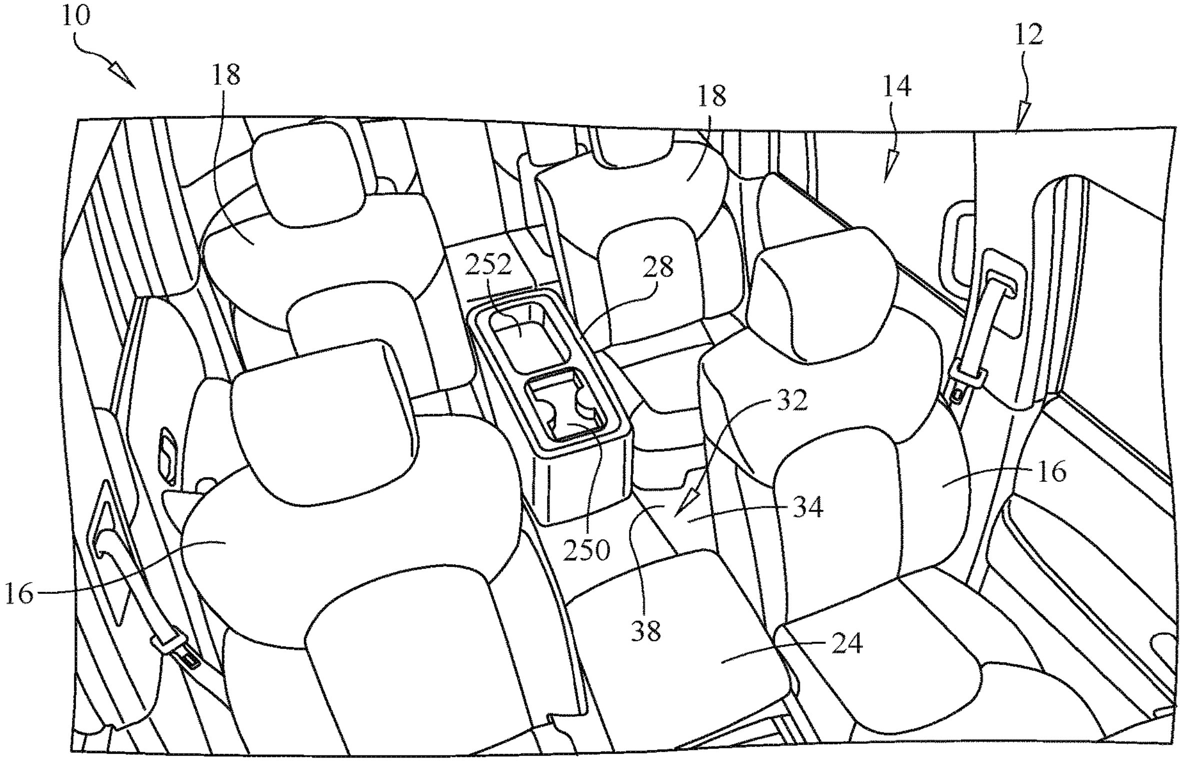
FIG. 2 is a perspective view of the passenger compartment of the vehicle depicted in FIG. 1, showing, among other features, a center console assembly located between two second row seats of the vehicle in accordance with the exemplary embodiment.

Referring initially to FIG. 1, a vehicle 10 is illustrated in accordance with a first embodiment. The vehicle 10 includes a vehicle body structure 12 that defines a passenger compartment 14, as shown in FIG. 2. In the depicted embodiment, the passenger compartment 14 includes a first row of seats 16, a second row of seats 18 and either a third row of seats or a cargo area 20. For purpose of describing the invention, the third row of seats is referred to as the cargo area 20 because the third row of seats can be folded down in order to define or extend a cargo area (not shown) rearward of the cargo area 20.

The passenger compartment 14 also includes a front center console 24, a battery case assembly 26 (shown in FIGS. 4-7 and 10-21) and a center console assembly 28 (shown in FIGS. 2-4, 10 and 22-42) that covers and conceals the battery case assembly 16.

The vehicle body structure 12 includes a floor structure 32 (also referred to as a vehicle floor structure 32). The floor structure 32 includes an upper surface 34 that defines a front seat area 36, a second-row seat area 38 and a rearward area 40. The first row of seats 16 and the front center console 24 are installed to the upper surface within the front seat area 36. The second row of seats 18, the battery case assembly 26 and the center console assembly 28 are all installed to the upper surface 34 within the second-row seat area 38. If the vehicle 10 includes a third row of seats, the third row of seats are installed to the upper surface 34 within the rearward area 40. Alternatively, the rearward area 40 defines a large cargo area.

The floor structure 32 further includes a tunnel 44 that extends beneath a portion of the upper surface 34 of the vehicle floor structure 32 in at least the second-row seat area 38 to other sections beneath the floor structure 32, as is described further below. The upper surface 34 of the floor structure 32 also include various surface shapes and contours that described in greater detail below.

Figure 3:
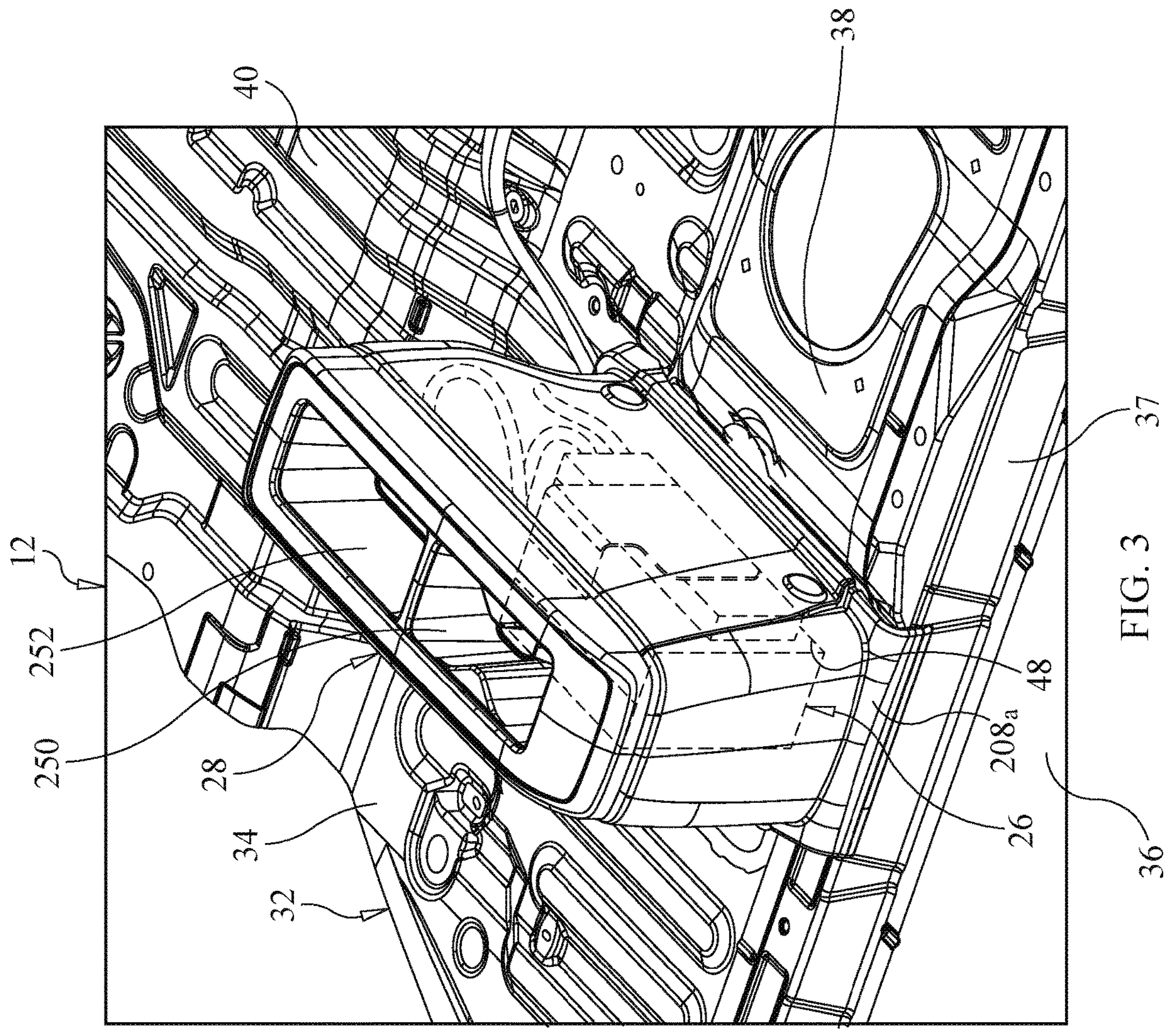
FIG. 3 is a perspective view of a floor structure of the passenger compartment with all seats and carpeting removed showing the center console assembly attached to the floor structure in accordance with the exemplary embodiment.
Figure 21:
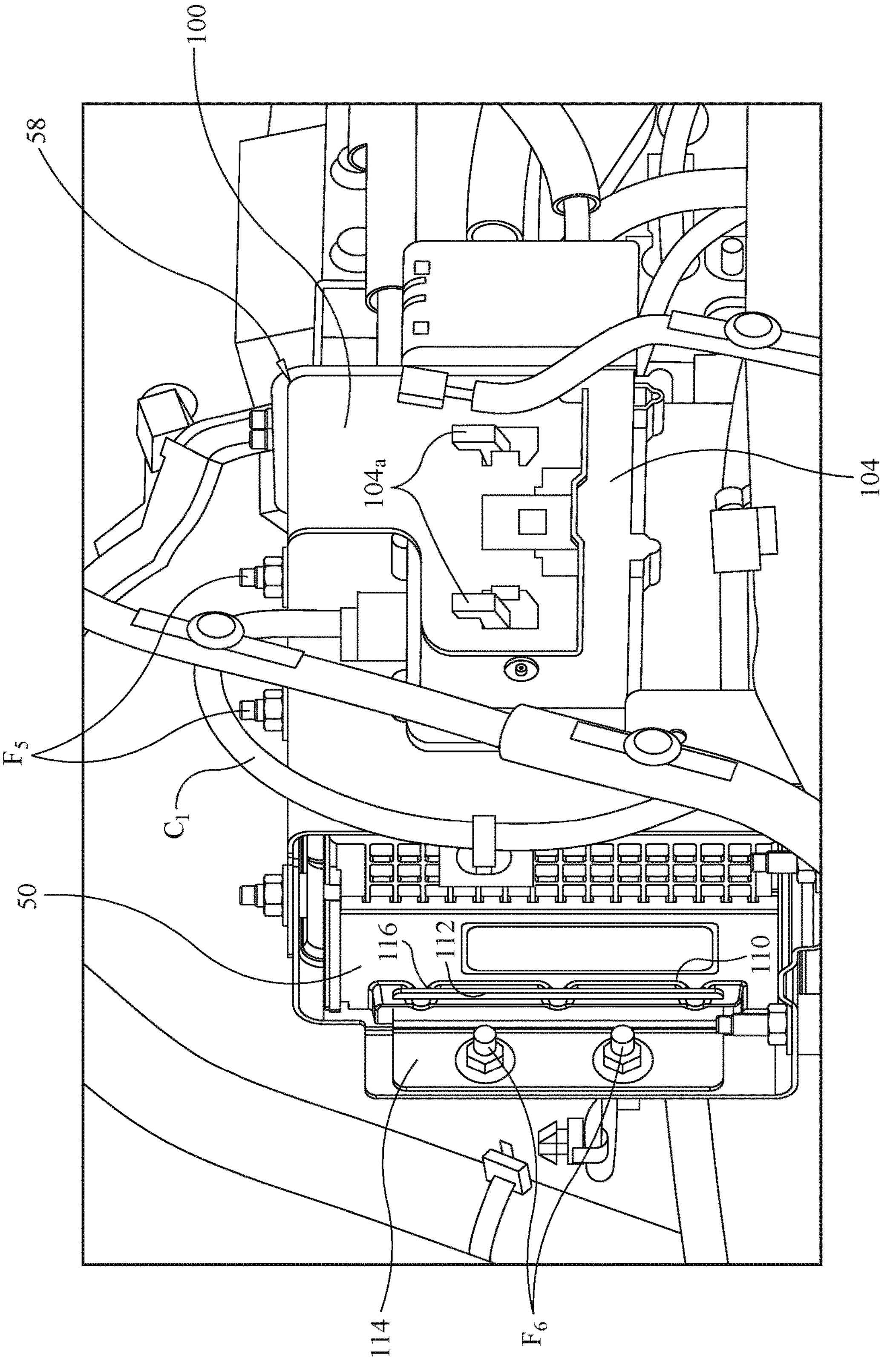
FIG. 21 is a side perspective view of the battery receiving structure and the battery showing the cable extending from the battery circuit box toward the rear of the battery receiving structure in accordance with the exemplary embodiment.

A description of the battery case assembly 26 is now provided with specific reference to FIG. 21. In FIG. 3, the battery case assembly 26 is covered and concealed by the center console assembly 28. As shown in the cross-sectional view in FIG. 4, the battery case assembly 26 fits within a cavity 48 defined within the center console assembly 28, as is described further below.

Figure 5:
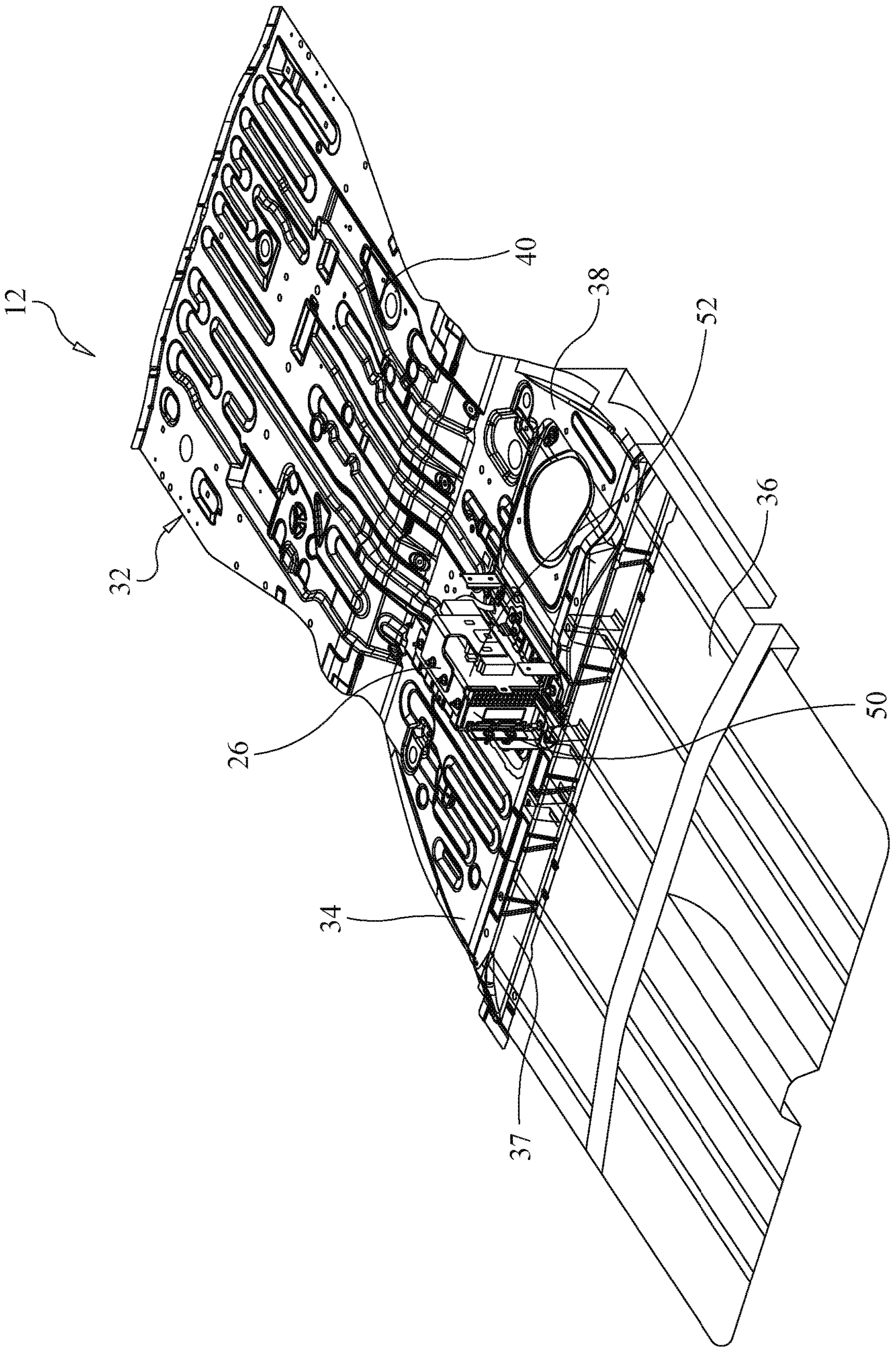
FIG. 5 is a perspective view of the upper surface of the floor structure showing only the battery and the battery receiving structure of the battery case assembly attached to the floor in accordance with the exemplary embodiment.
Figure 6:
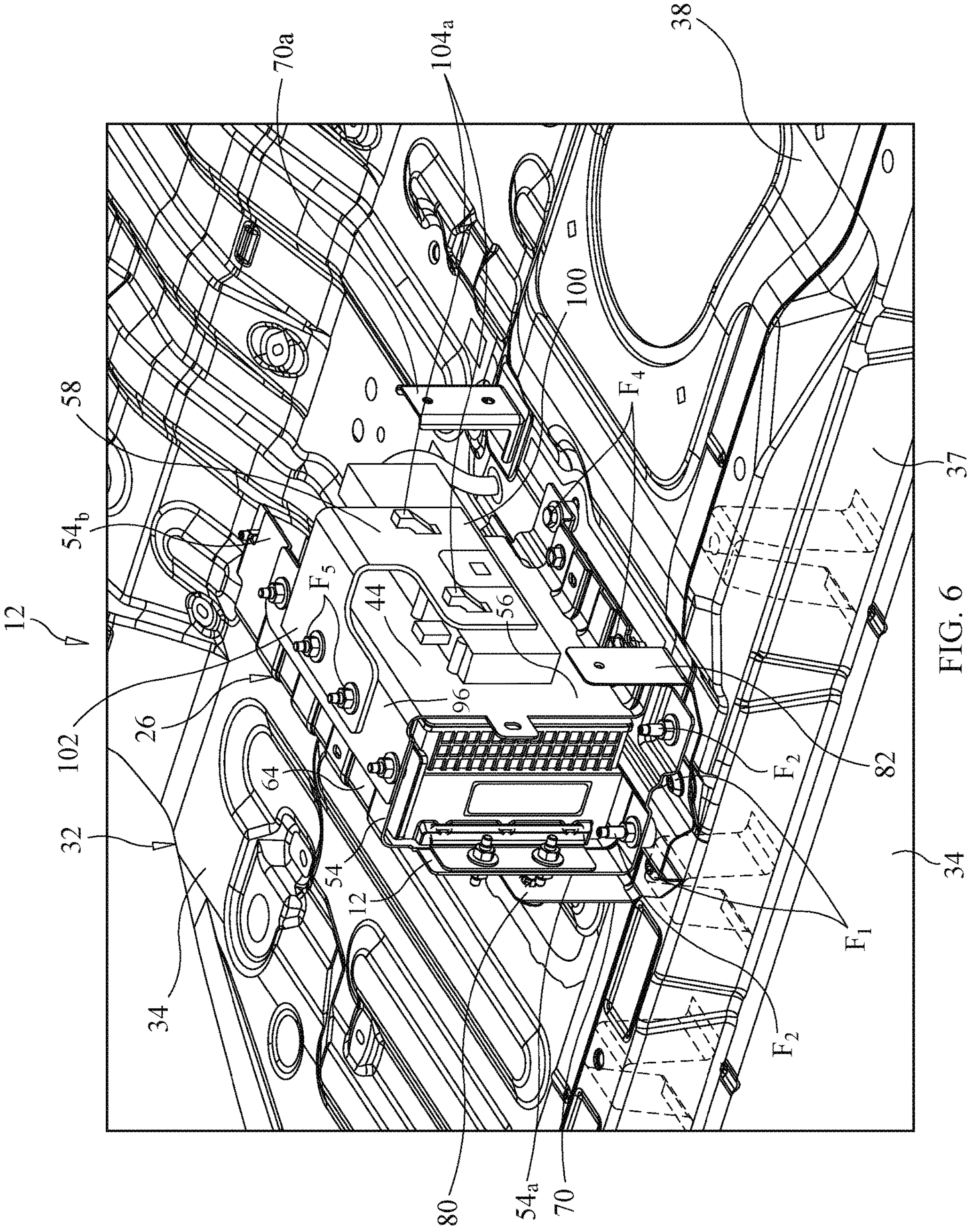
FIG. 6 is a perspective view of a portion of the upper surface of the floor structure showing the battery and the battery receiving structure of the battery case assembly along with mounting brackets that attach to the center console assembly in accordance with the exemplary embodiment.
Figure 7:
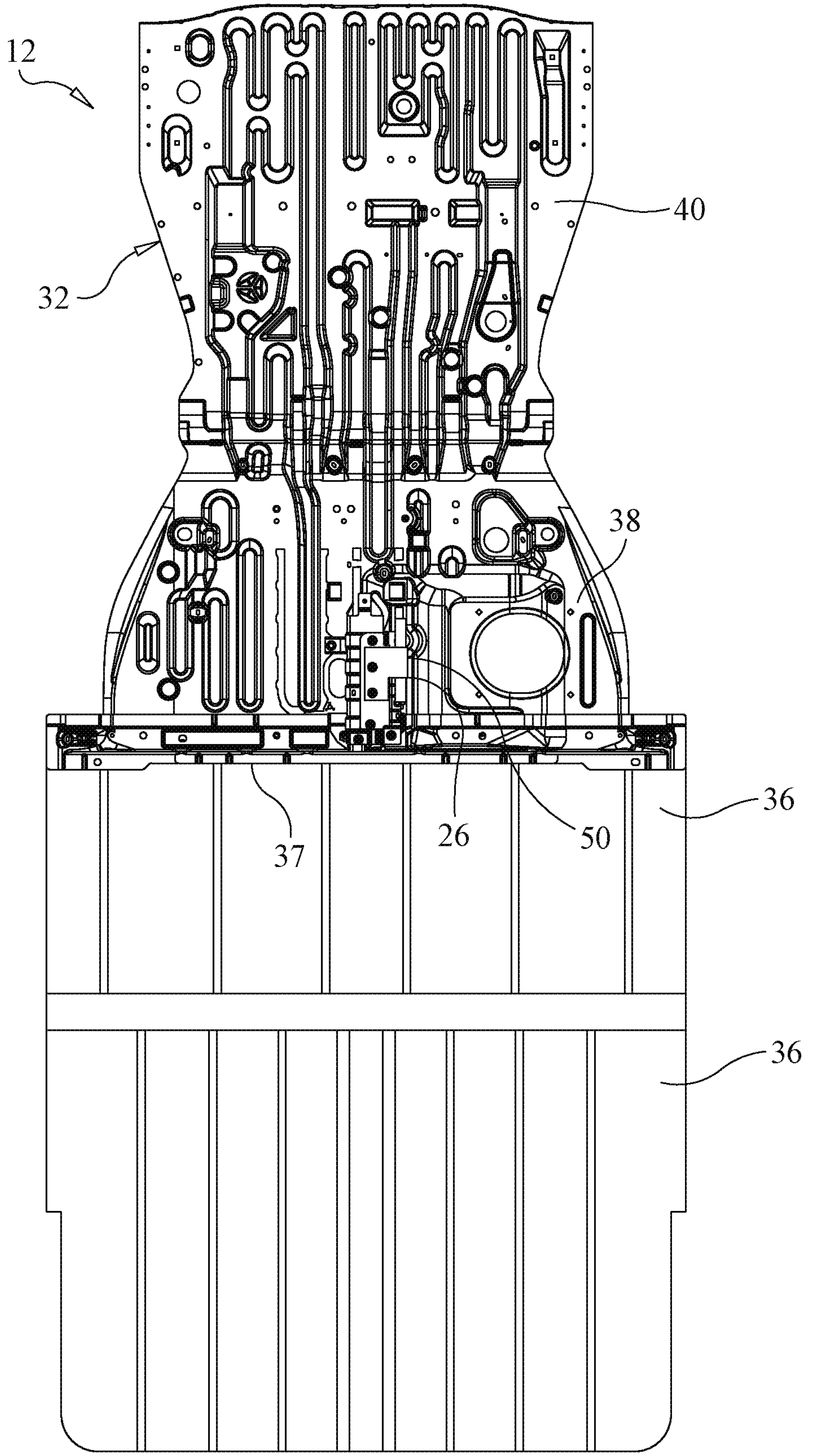
FIG. 7 is a top view of the upper surface of the floor structure showing the battery and the battery receiving structure of the battery case assembly attached to the center console assembly in accordance with the exemplary embodiment.

The battery case assembly 26 includes a battery 50 and a structure 52 that is designed and dimensioned to surround, retain and protect the battery 50. The structure 52 includes a first member 54, a second member 56 and a third member 58. As shown in FIGS. 5 and 6. The structure 52 is attached to the upper surface 34 of the floor structure 32 at a central area of the second-row seat area 38.

The first member 54 is formed from a thick metal plate that is bent, molded or otherwise shaped to have a bottom portion 60, an upright portion 62 and a top portion 64. The bottom portion 60, the upright portion 62 and the top portion 64 of the first member 54 define an overall C-shape as viewed from a front end thereof (FIGS. 6 and 12-17), with the bottom portion 60 and the top portion 64 both extending in a lateral vehicle direction away from the upright portion 62 and being parallel to one another. The bottom portion 60, the upright portion 62 and the top portion 64 of the first member 54 are formed from a single metal panel as a homogenous, unitary, single element.

The bottom portion 60 is attached to the upper surface 34 of the vehicle floor structure 32. More specifically, the first member 54 is removably attached to the vehicle floor structure 32 at a front end **54*a* thereof and a rear end 54*b*** thereof.

As shown in FIGS. 6, 14, 15 and 17, the front end **54*a* of the first member 54 is attached via mechanical fasteners $F_2$ to a mounting plate 70. Once the bottom portion 60 of the first member 54** is placed in position with the fasteners $F_2$ extending through corresponding openings, nuts N are threaded onto the fasteners $F_2$ and tightened.

The mounting plate 70 has an overall U-shape and is attached to the vehicle floor structure 12 via mechanical fasteners $F_1$ proximate the front end **54*a* of the first member 54. The mounting plate 70 includes a first flat portion 72, a rib portion 74, a contoured portion 76, a second flat portion 78, a first center console attachment flange 80 and a second center console attachment flange 82**, as a single monolithic, unitary single element.

Figure 14:
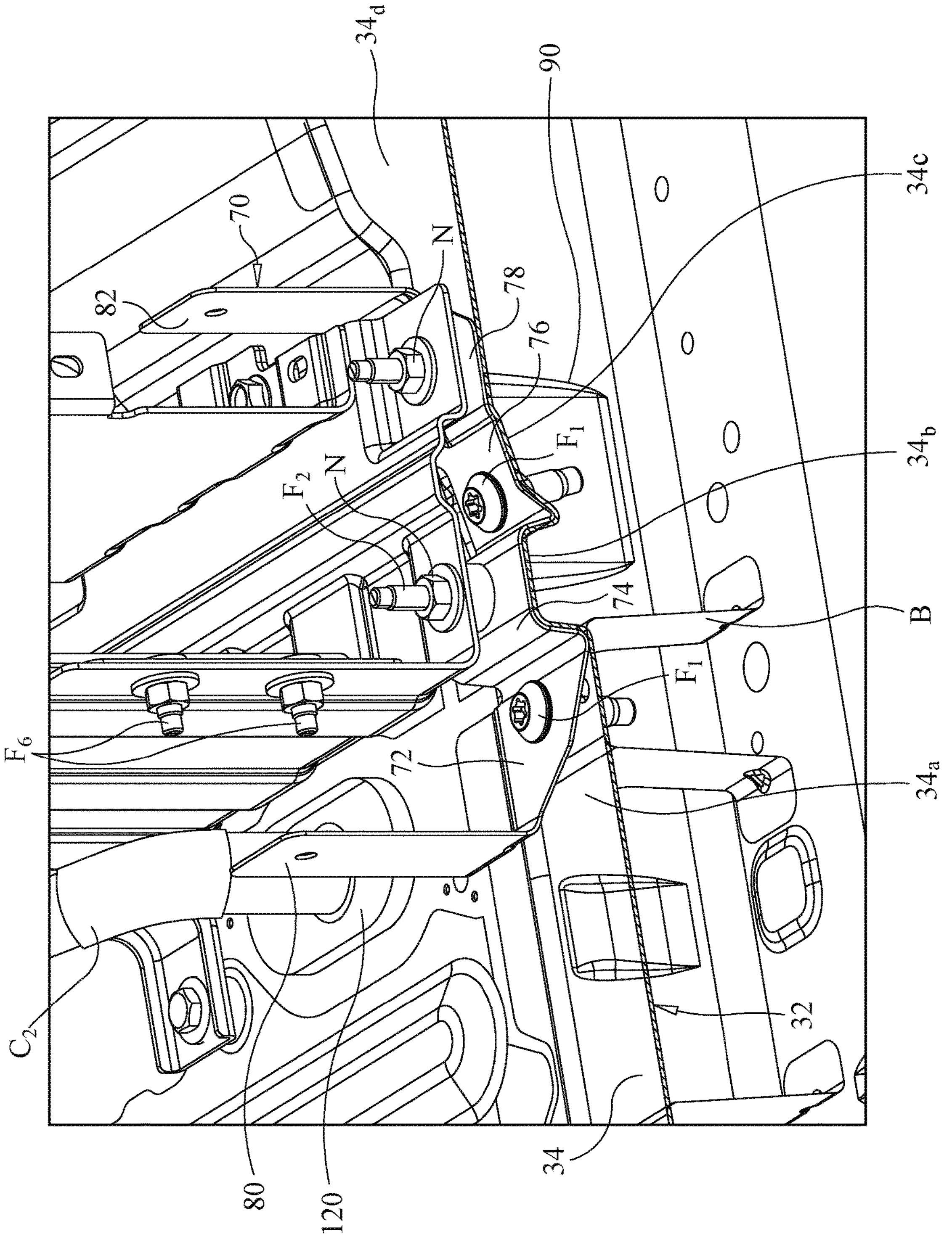
FIG. 14 is another front partial cross-sectional perspective view of the battery receiving structure with the battery removed showing sections of the mounting plate and sections of the floor structure that the mounting plate overlays in accordance with the exemplary embodiment.
Figure 15:
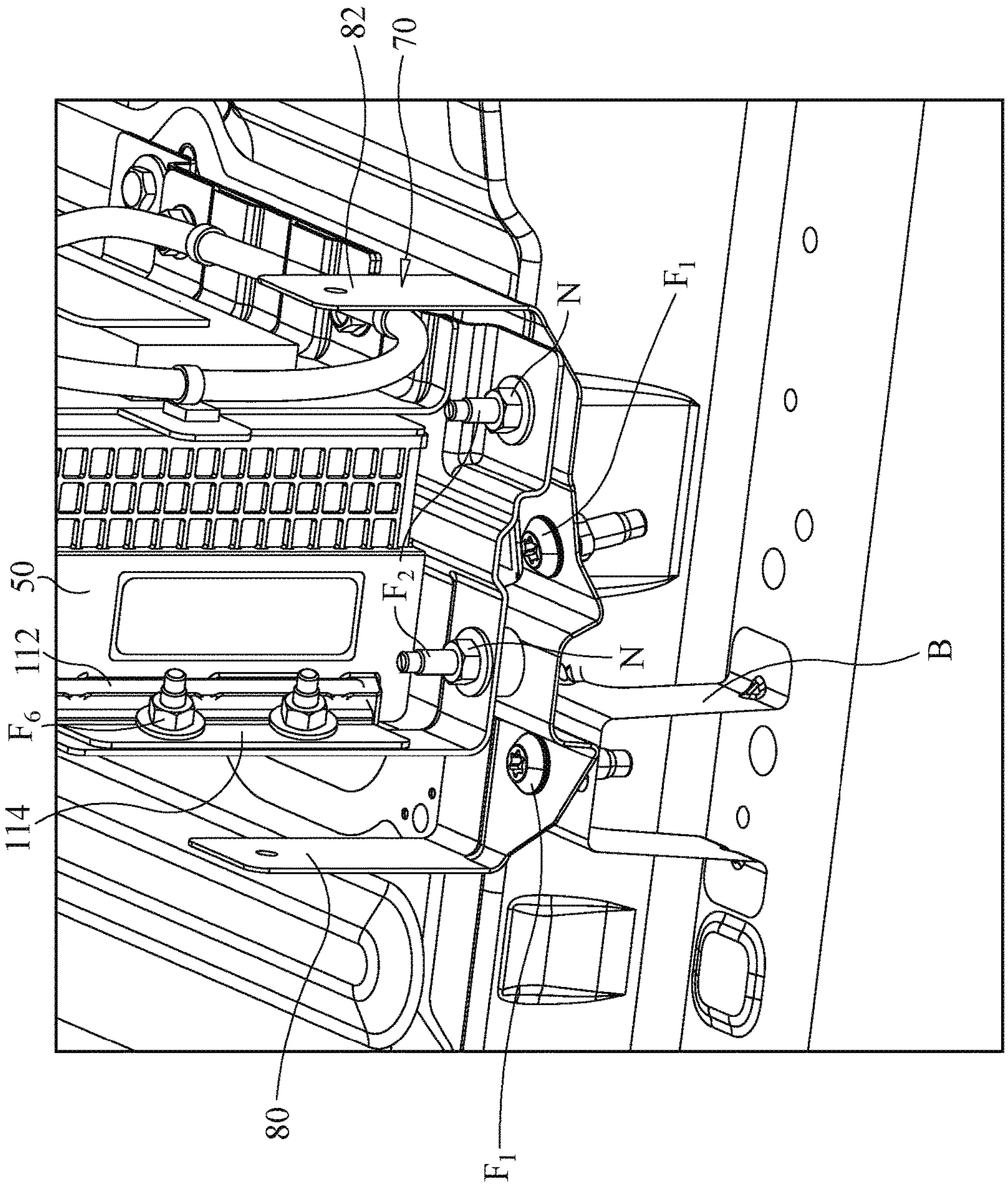
FIG. 15 is yet another front partial cross-sectional perspective view of the battery receiving structure and the battery with sections of the upper floor panel removed showing the sections of the mounting plate and an attachment plate that secures the battery in the hollow interior of the battery receiving structure in accordance with the exemplary embodiment.

As shown in FIG. 14, the first flat portion 72 overlays a flat portion **34*a* of the upper surface 34 of the floor structure 32, the rib portion 74 overlays a rib portion 34*b*, the contoured portion 76 overlays a contoured portion 34*c* of the upper surface 34 and the second flat portion 78 of the mounting plate 70 overlays a second flat portion 34*d* of the upper surface 34 of the floor structure 32. The fasteners $F_1$ are installed from an upper side of the mounting plate 70, through the flat portion 34*a* and contoured portion 34*c* of the floor structure 32 and into threaded nuts (not shown) that are welded to the floor structure 32 in a conventional manner. One of the fasteners $F_1$ is further fixed to a bulkhead B beneath the mounting plate 70 and a corresponding portion of the floor structure 12, as shown in FIG. 14. The other fasteners $F_1$ extends through the contoured portion 76 of the mounting bracket 70, through the contoured portion 34*c* of the floor structure 12 and into a threaded nut (not shown if FIG. 14) that is welded to the underside of the contoured portion 34*c* of the floor structure 12**.

The rib portion **34*b* of the upper surface 34 of the upper surface 34 of the floor structure 32 is not required but is optional. In the place of the rib portion 34*b*, the flat portion 34*a* can extend through the area where the rib portion 34*b* is shown in FIG. 14. In other words, the rib portion 34*b* can be eliminated with the flat portion 34*a* extending to the contoured portion 34*c***.

With the mounting bracket 70 fixedly attached via fasteners $F_1$ to the floor structure 12 and the bulkhead B, the mounting bracket 70 is rigidly and securely fixed in place.

Further, with the front end **54*a* of the first member 54 attached via mechanical fasteners $F_2$ to a mounting plate 70, the battery receiving structure 52 is also securely fixed to the floor structure 12**.

The first center console attachment flange 80 and the second center console attachment flange 82 extend upward from opposite ends of the mounting plate 70. The first and second center console attachment flanges 80 and 82 are dimensioned and oriented to receive fasteners that attach the center console assembly 28 thereto, as is described further below.

Figure 11:
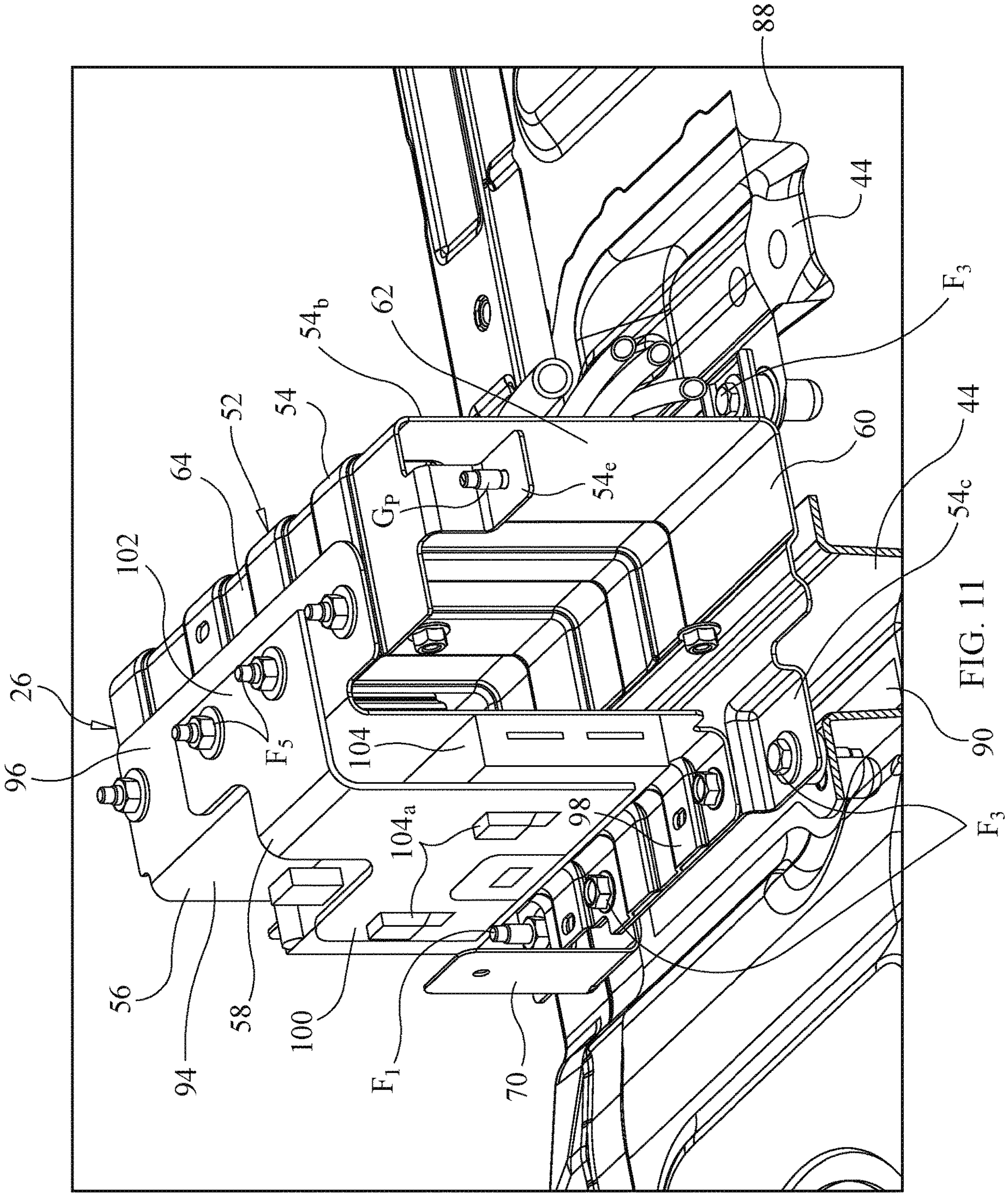
FIG. 11 is a rear perspective view of the battery receiving structure with the battery removed and with sections of a top panel of the floor assembly removed showing tunnel and reinforcement panels located beneath the floor in accordance with the exemplary embodiment.
Figure 12:
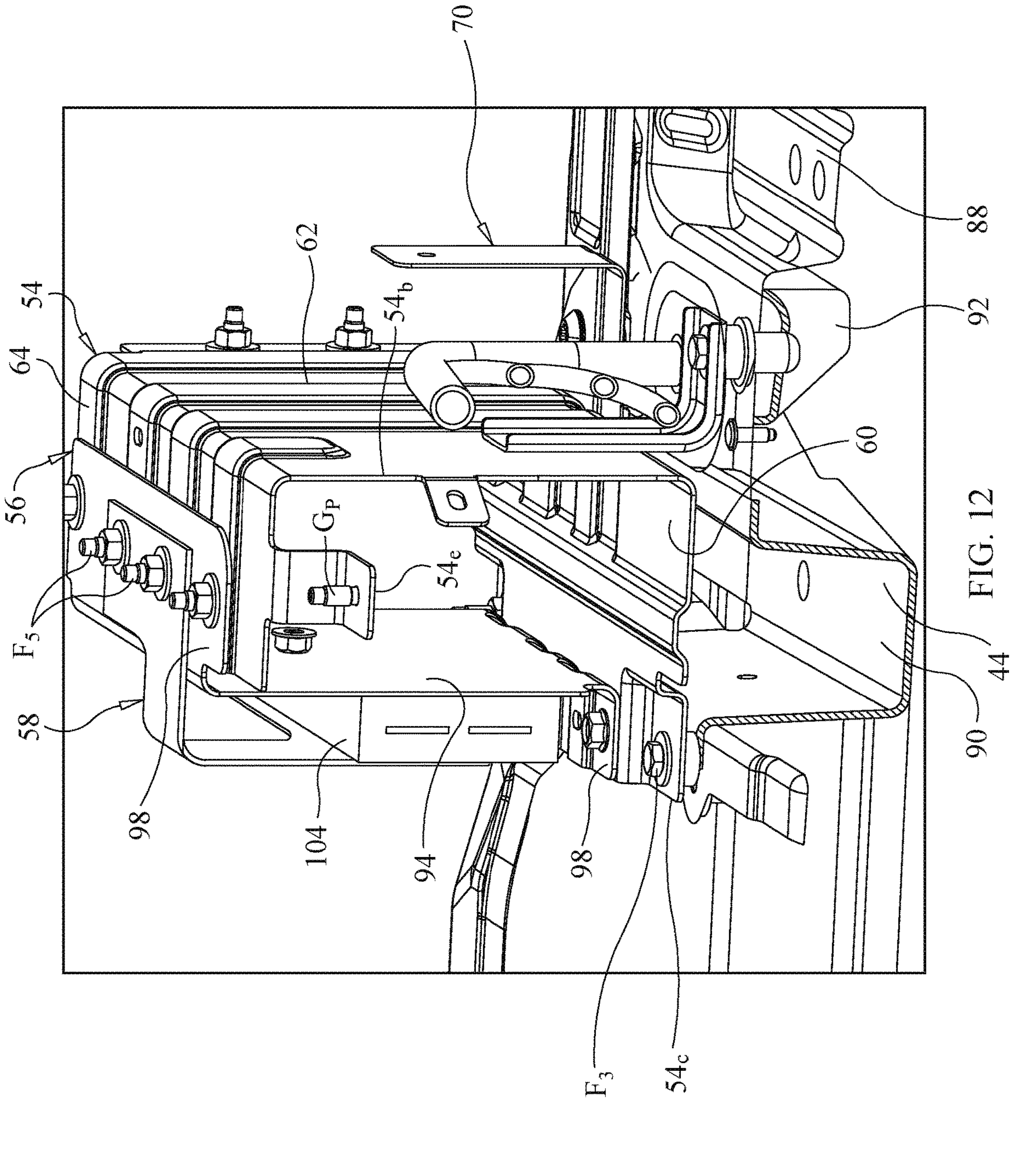
FIG. 12 is another rear perspective view of the battery receiving structure with the battery removed and with sections of a top panel of the floor assembly removed showing tunnel and reinforcement panels located beneath the floor in accordance with the exemplary embodiment.
Figure 20:
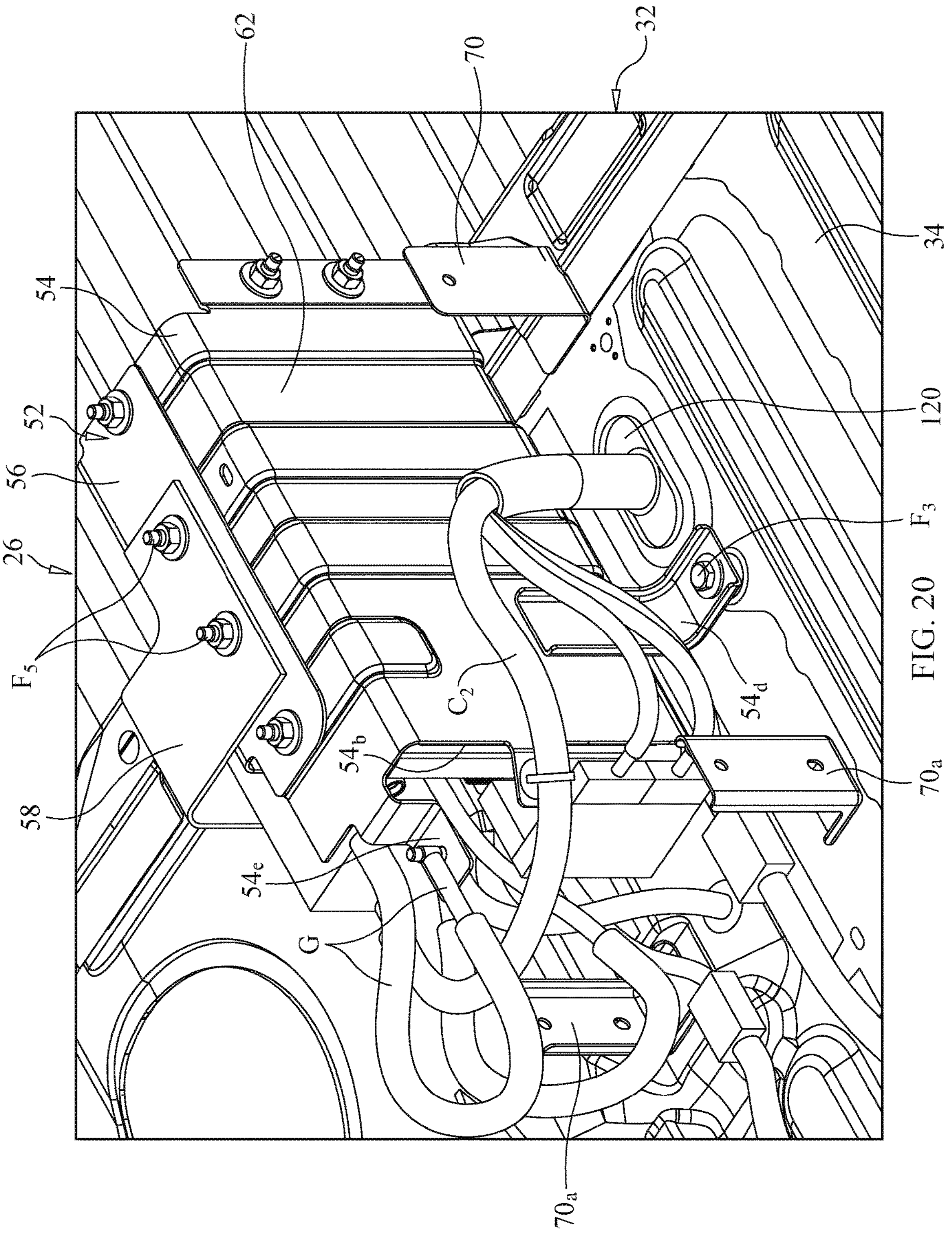
FIG. 20 is another top rear perspective view of the battery receiving structure and the battery showing the ground post and the ground cable of the battery and further showing another cable extending around the rear of the battery receiving structure to a grommet and into a portion of the tunnel beneath the grommet in accordance with the exemplary embodiment.

As shown in FIGS. 11-12 and 20, the rear end **54*b* of the first member 54 is also attached to the floor structure 32 via fasteners $F_3$. More specifically, the rear end 54*b* of the first member 54 includes an attachment flange 54*c* that is unitarily formed with the remainder of the first member 54, as shown in FIG. 12. The fastener F3 at the attachment flange 54*c* further extends through a flange of the tunnel plate 90. Thus, the battery receiving structure 52 is further rigidly fixed to the floor structure 12**.

As shown in FIG. 11, at an opposite side of the battery case assembly 26 from the attachment flange **54*c*, an attachment bracket 54*d* is weld or otherwise fixedly attached to the upright portion 62 of the first member 54 and fixes the first member 54 to the floor structure 32 via one of the fasteners $F_3$. Further as shown in FIG. 12, the fastener $F_3$ also extends through a rear flange of the tunnel plate 90**.

It should be understood from the drawings and the description herein that the tunnel plates 88 and 90 also serve as reinforcement members to strengthen the connection between the battery receiving structure 52 and the floor structure 12.

Figure 8:
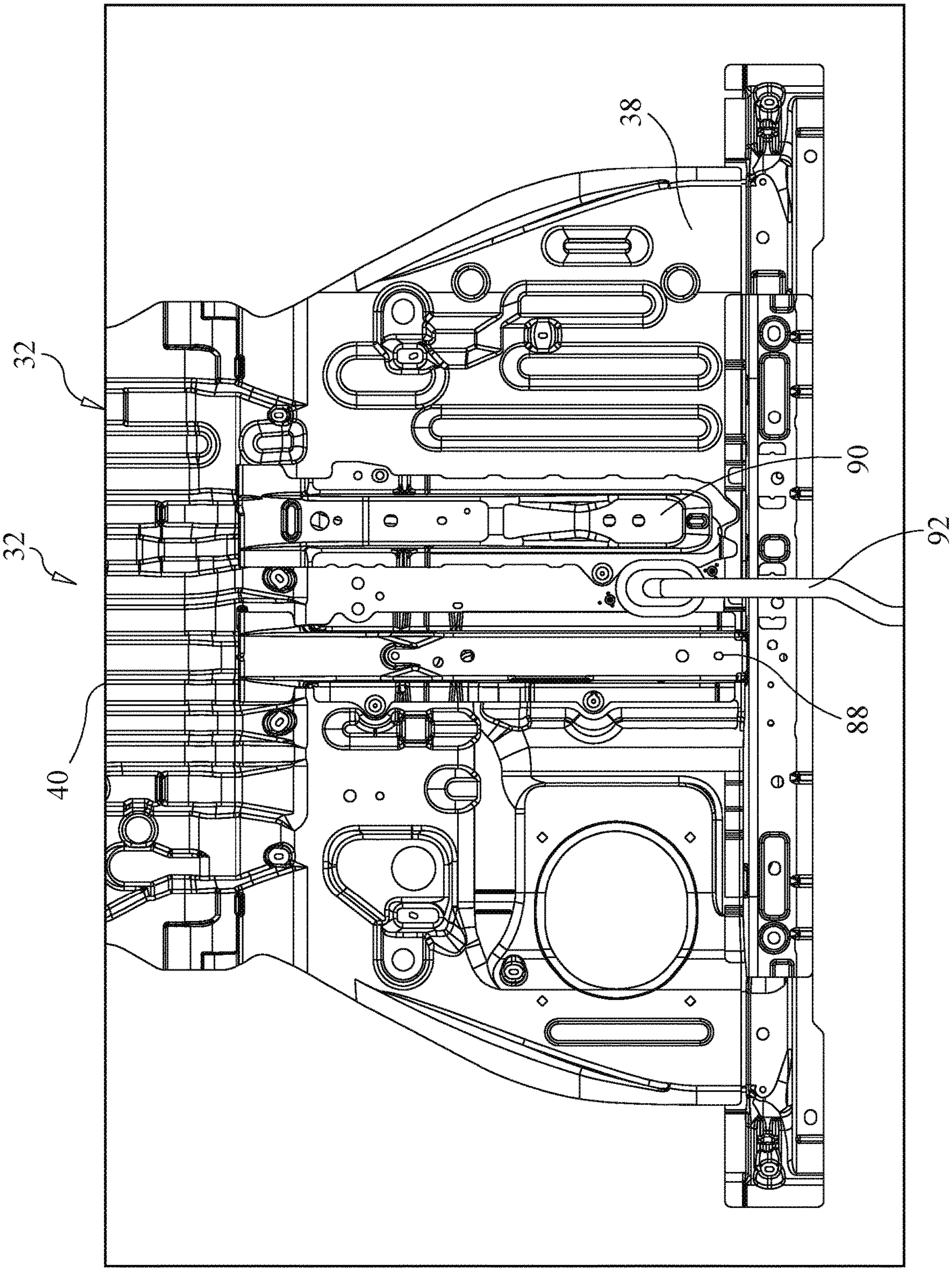
FIG. 8 is a bottom view of a portion of the floor structure showing tunnel plates that also serve as reinforcement plates in accordance with the exemplary embodiment.
Figure 9:
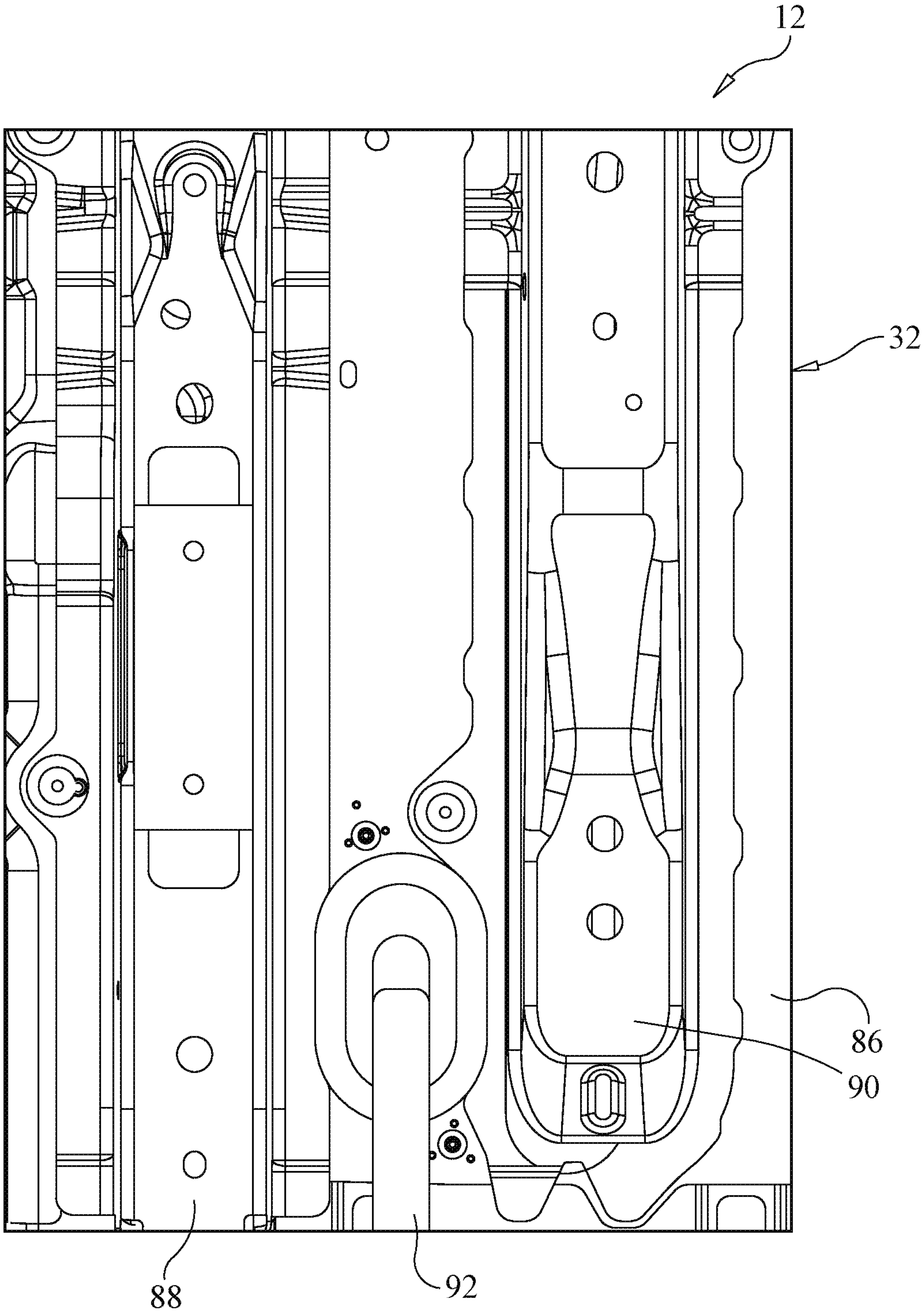
FIG. 9 is another bottom view of the portion of the floor structure showing the tunnel plates in accordance with the exemplary embodiment.
Figure 10:
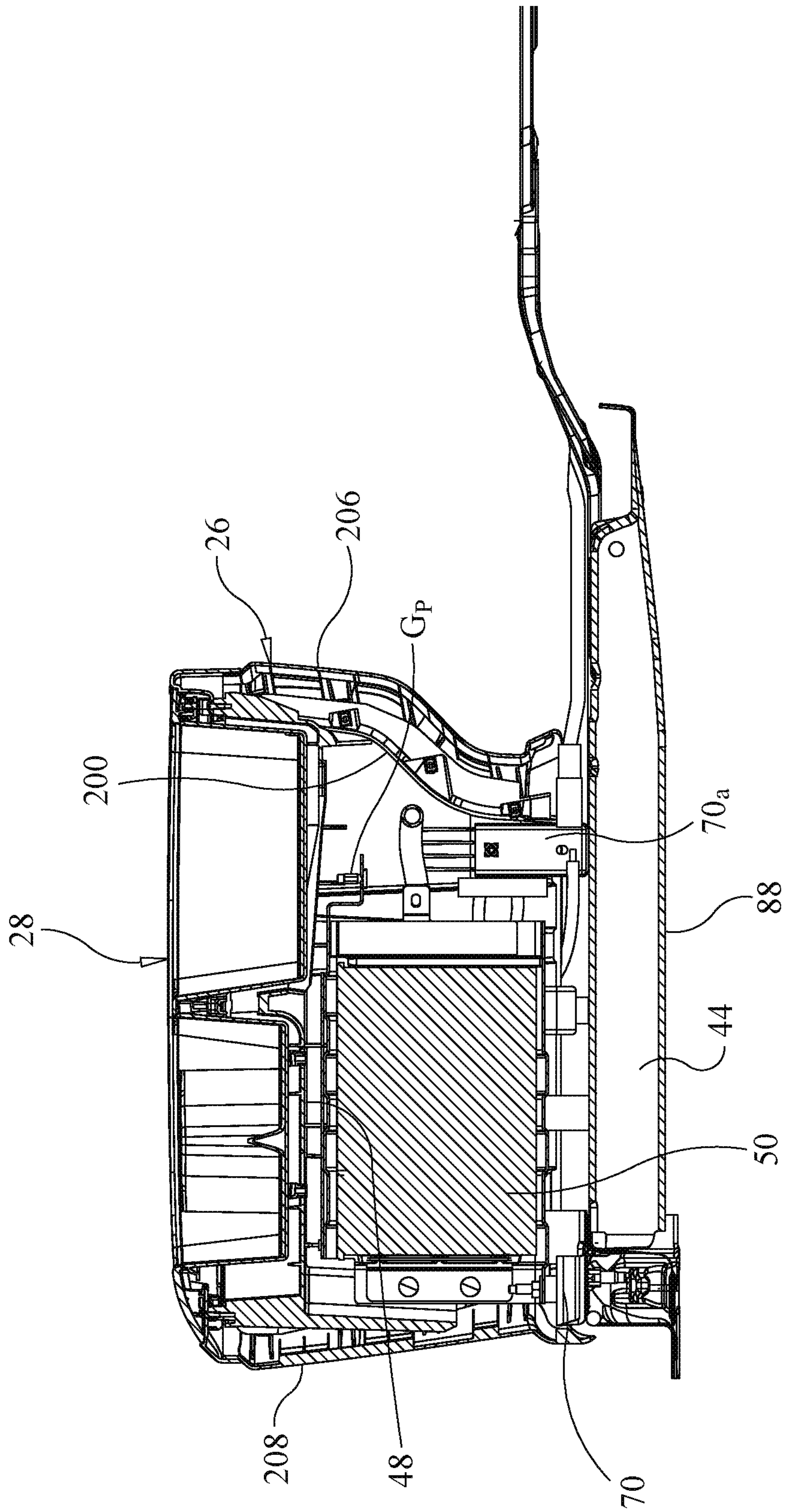
FIG. 10 is a longitudinal cross-sectional view of a portion of the floor structure, the battery receiving structure and the battery in accordance with the exemplary embodiment.
Figure 13:
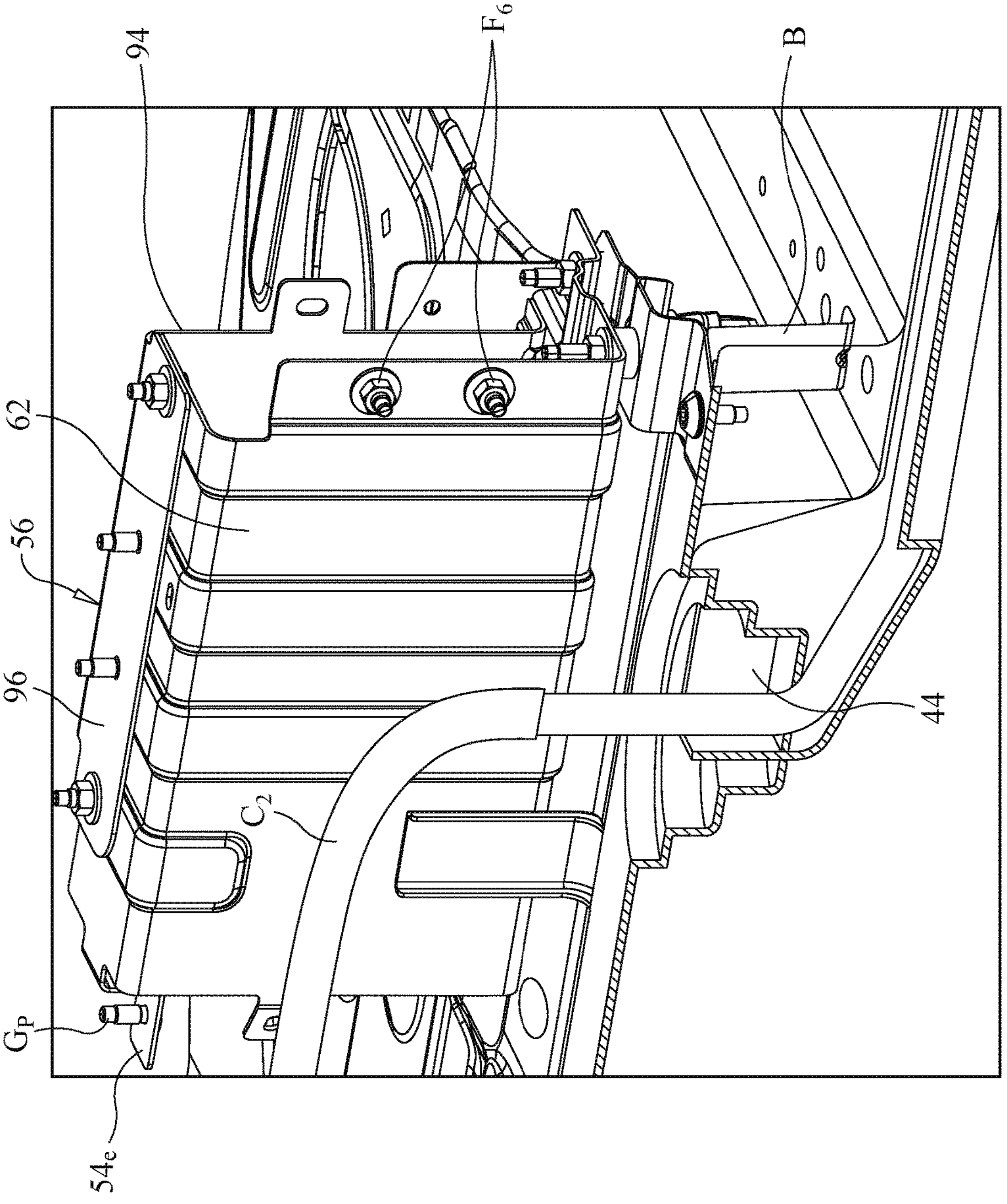
FIG. 13 is a front partial cross-sectional perspective view of the battery receiving structure with the battery removed and with sections of a top panel of the floor assembly and the mounting plate removed showing a portion of the tunnel and a reinforcement panel located beneath the floor in accordance with the exemplary embodiment.

The tunnel 44 of the vehicle floor structure 12 includes several tunnel portions. For instance, a portion of the tunnel 44 is defined beneath the upper surface 34 of the vehicle floor structure 12 at a location adjacent to the first member 54, as shown in FIG. 13. As shown in FIGS. 8 and 9, tunnel plates 88, 90 and 92 are attached to an underside 86 of the floor structure 32. The tunnel plates 88, 90 and 92 cover and conceal portions of respective portions of the tunnel 44.

Figure 16:
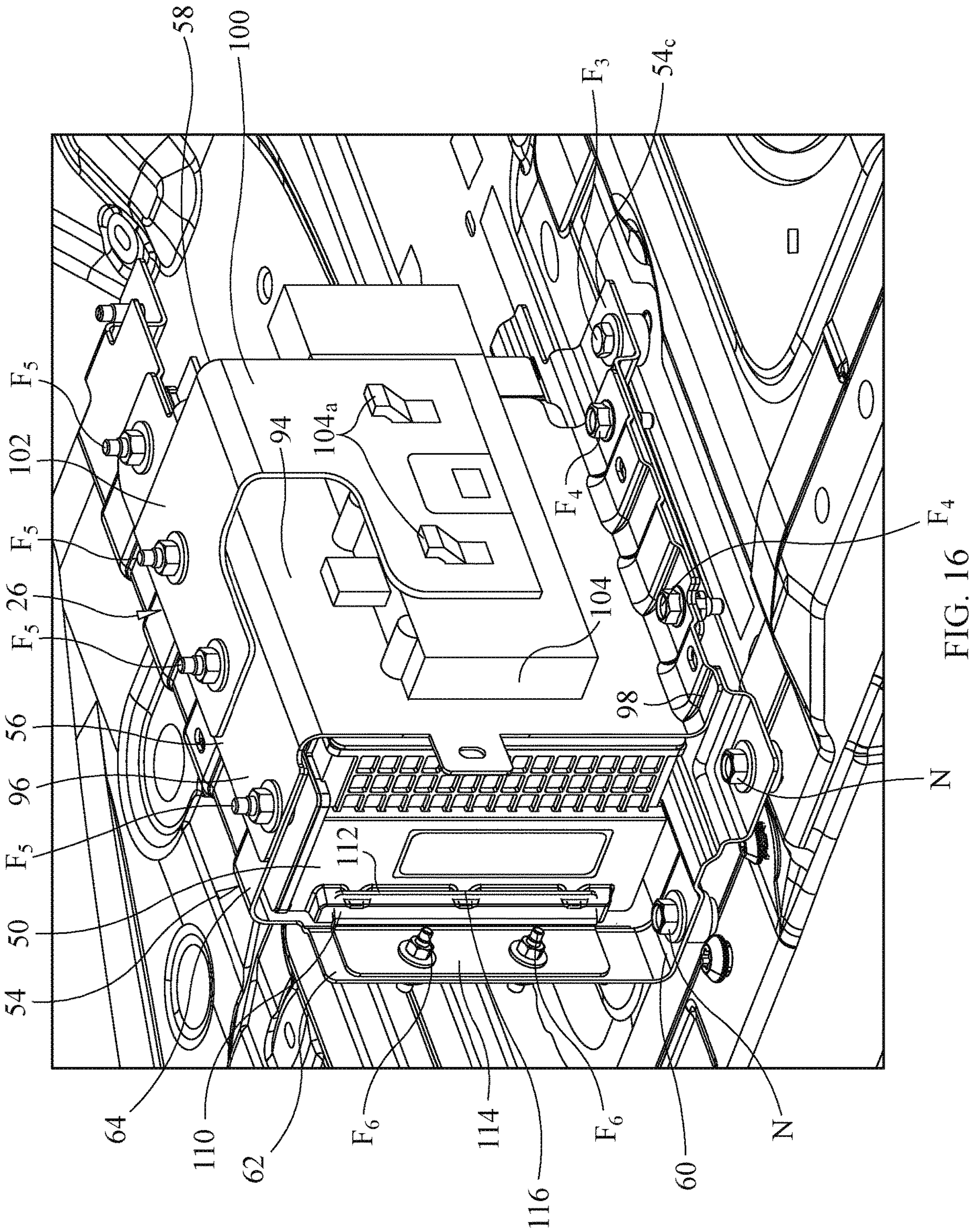
FIG. 16 is another perspective view of the battery receiving structure and the battery with a portion of the mounting plate removed in order to show a third member of the battery receiving structure and a battery circuit box retained by the third member in accordance with the exemplary embodiment.
Figure 17:
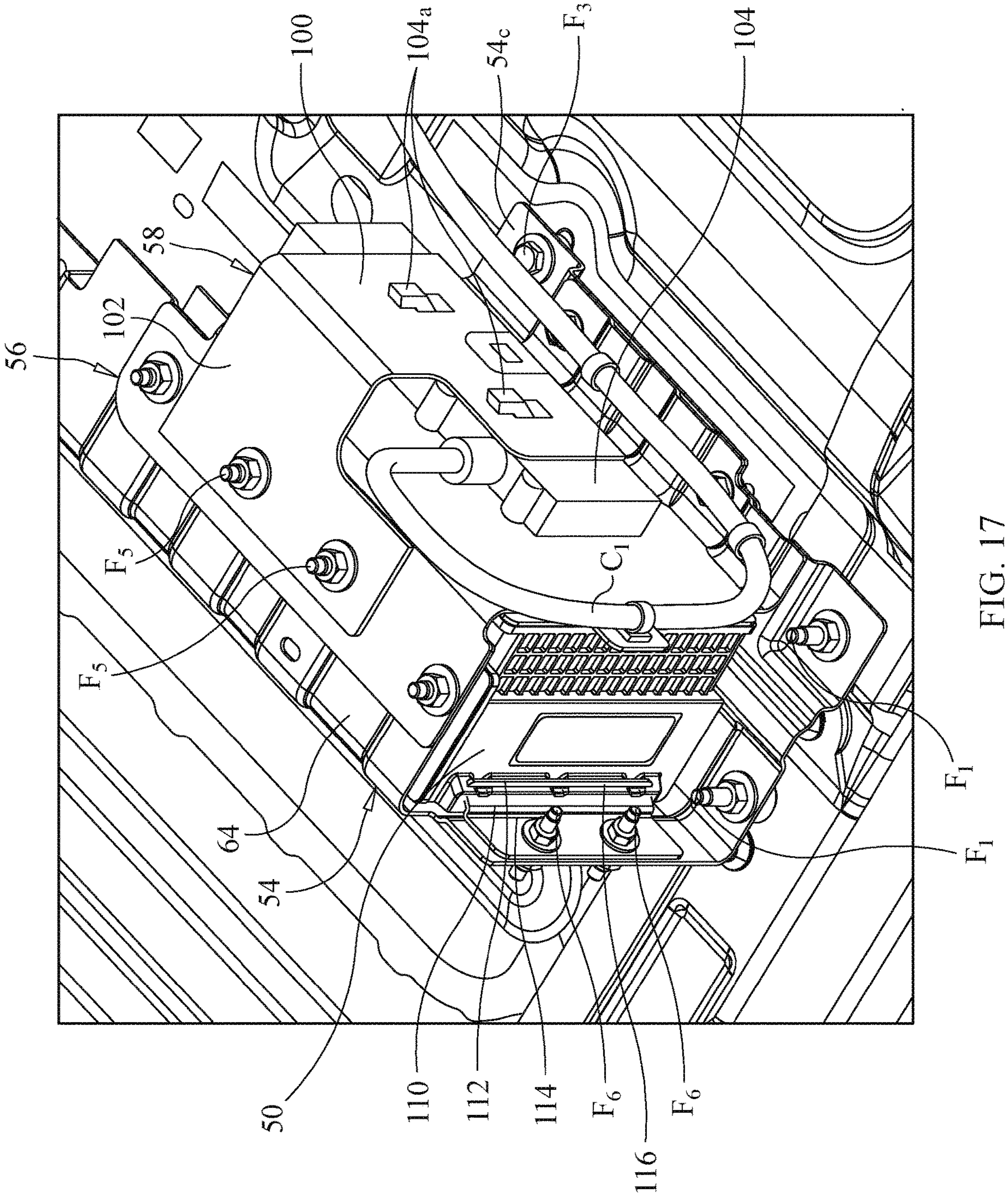
FIG. 17 is top front perspective view of the battery receiving structure and the battery with the mounting plate completely removed in order to show the third member of the battery receiving structure, the battery circuit box and a cable that extends from the battery circuit box rearward in accordance with the exemplary embodiment.

The second member 56 of the structure 52 of the battery case assembly 26 includes an upright section 94, a top section 96 and a bottom section 98 that together define a Z-shape as viewed from a front thereof in FIGS. 6, 16 and 17. The upright section 94, the top section 96 and the bottom section 98 of the second member are formed from a single metal panel as a homogenous, unitary, single element. The top section 96 of the second member 56 is attached to the first member 54 such that the first member 54 and the second member 56 define the structure 52 as a hollow rectangular structure 52 with the bottom portion 60, the upright portion 62 and the top portion 64 of the first member 54 defining three sides of the hollow rectangular structure 52 and the upright section 94 of the second member 56 defining a fourth side of the hollow rectangular structure. The hollow rectangular structure 52 has an open forward end at the front end 54*a* and an open rearward end at the rear end 54*b* of the first member 54. The bottom section 98 of the second member 56 is fixed to the bottom portion 60 of the first member 54 via mechanical fasteners $F_4$, as shown in FIGS. 6 and 11-12.

The third member 58 has an upright part 100 and a horizontal part 102. The upright part 100 is configured to retain a battery circuit box 104 between the upright part 100 of the third member 58 and the upright section 94 of the second member 56. The horizontal part 102 of the third member 58 extends over the top section 96 of the second member 56 and is attached thereto via fasteners $F_5$. The battery circuit box 104 includes hook-shaped projections 104*a* that extend through openings in the horizontal part 102 of the third member 58 of the structure 52, as shown in FIGS. 6, 11, 16-18 and 21.

The battery 50 itself is fitted within the hollow rectangular structure 52 such that forward end of the battery 50 is exposed at the open forward end 54*a* (the front end 54*a*) of the hollow rectangular structure 52. The rearward end of the battery 50 is exposed via the open rearward end 54*b* (the rear end 54*b*) of the hollow rectangular structure 52.

As shown in FIGS. 16 and 17, the front end of the battery 50 includes a projection 110 that is vertically oriented with the battery 50 installed to the structure 52. The projection 110 defines a slot 112. An attachment bracket 114 includes a tongue 116 that extends into the slot 112. The attachment bracket 114 is fixed to the upright portion 62 of the first member via fasteners $F_6$. Thus, the battery 50 is non-movably fixed to the structure 52 via the tongue 116 in the slot 112 and the fasteners $F_6$ being fixed to the upright portion 62 of the first member 54 of the structure 52.

Rearward and on opposite lateral sides of the battery case assembly 26, there are two mounting plates 70*a* welded or otherwise fastened to the upper surface 34 of the floor structure 32, as shown in FIGS. 6 and 18-20. The first and second center console attachment flanges 80 and 82 of the mounting bracket 70 and the mounting plates 70*a* are provided for attachment of the center console assembly 28, in a manner described further below.

Figure 18:
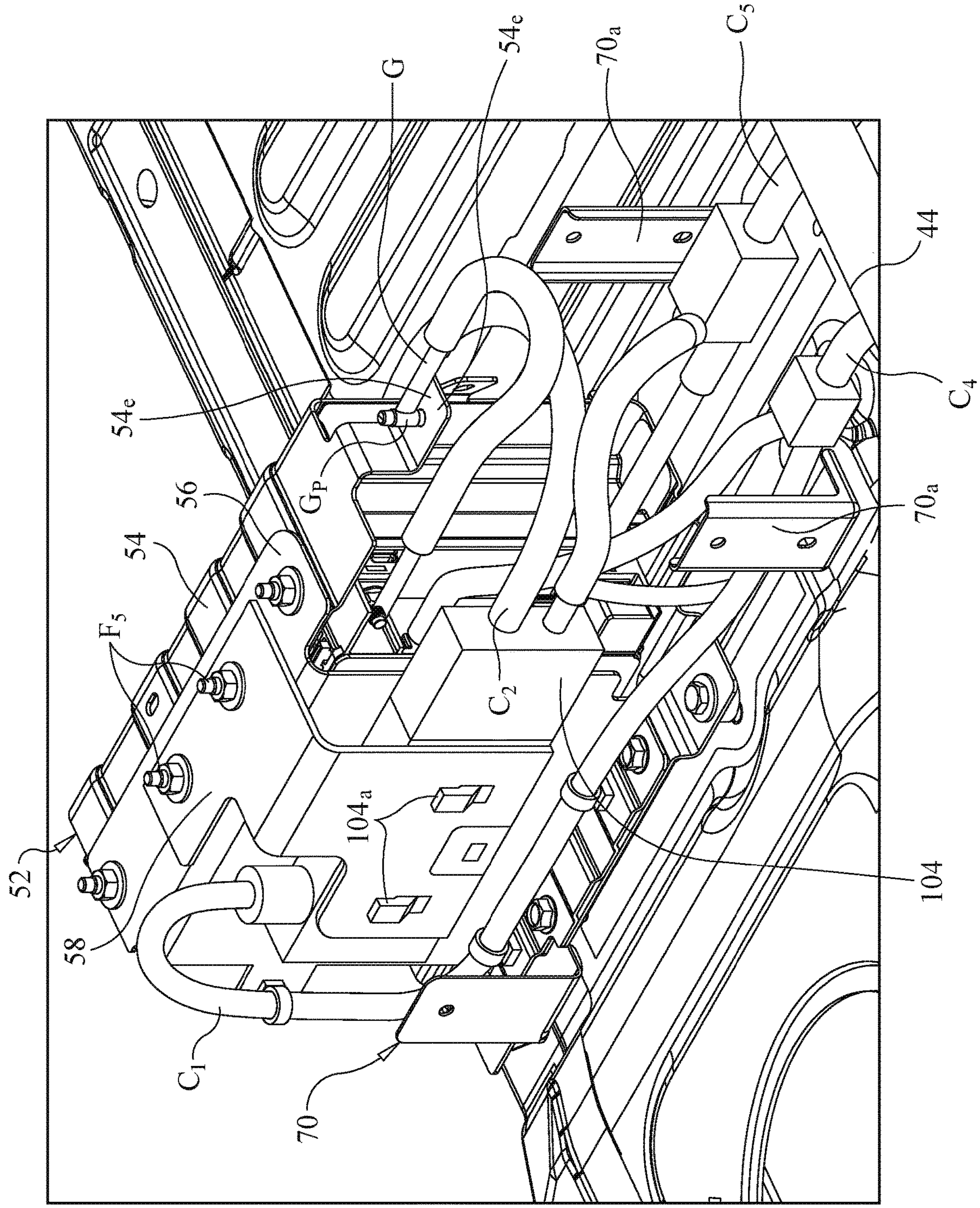
FIG. 18 is a top rear perspective view of the battery receiving structure and the battery showing the third member of the battery receiving structure, the battery circuit box and the cable extending from the battery circuit box rearward and into a portion of the tunnel beneath the floor and showing a ground post and a ground cable of the battery in accordance with the exemplary embodiment.

As shown in FIGS. 18-21, there are various cables $C_1$ and $C_2$ and a ground cable G shown rearward and beside the battery case assembly 26. The cable $C_1$ is attached to a forward area of the battery circuit box 104, extending downward and then rearward where it enters a portion of the tunnel 44, as shown in FIG. 18. The cable $C_2$ is attached to a rearward area of the battery circuit box 104 and extends around the rear of the battery 50 to a grommet 120 shown in FIGS. 14 and 20. The cable $C_2$ then enters the portion of the tunnel 44 defined in part by tunnel plate 92 shown in FIGS. 9 and 13.

Figure 19:
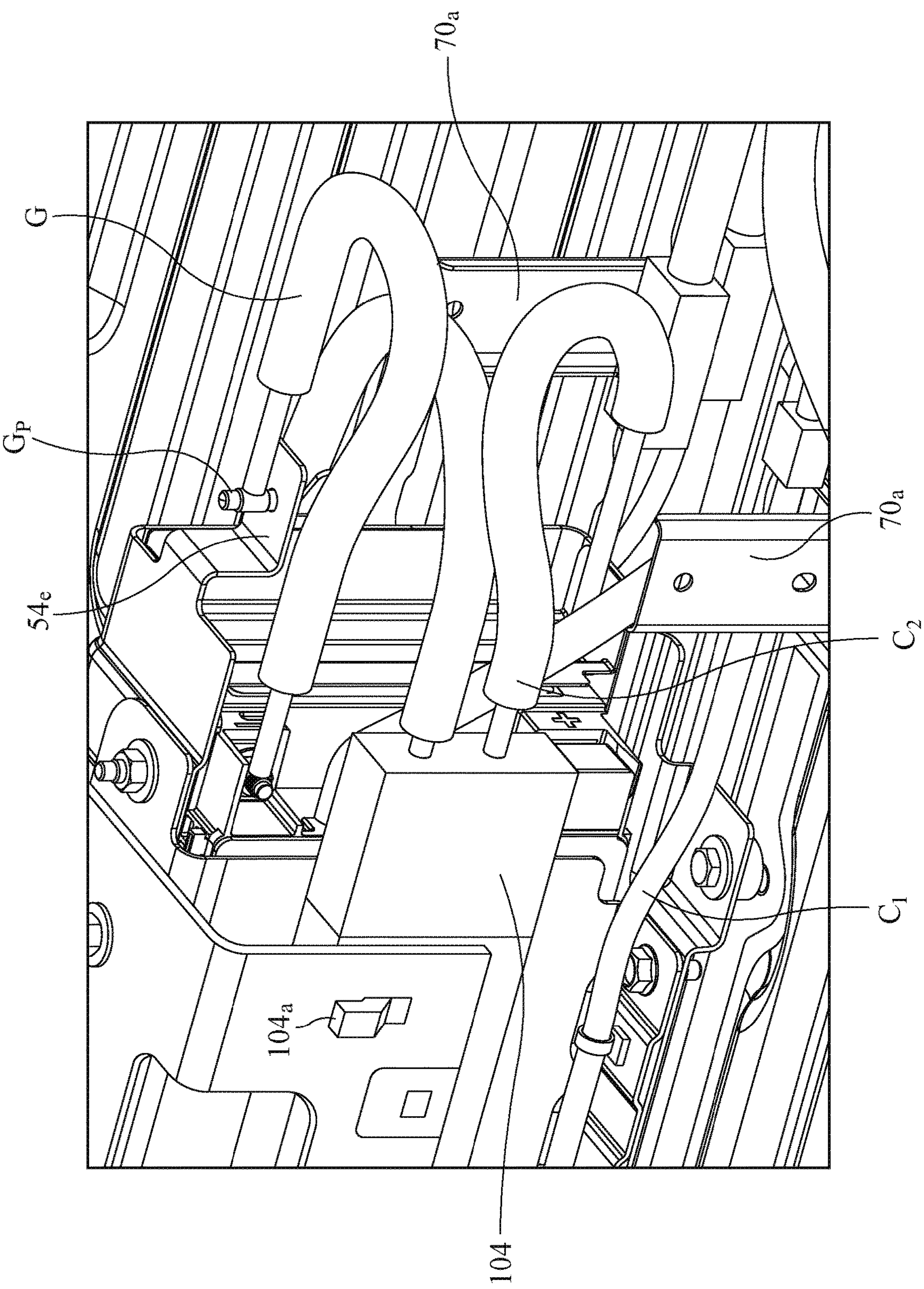
FIG. 19 is another top rear perspective view of the battery receiving structure and the battery showing the third member of the battery receiving structure, the battery circuit box and the cable extending from the battery circuit box and showing the ground post and the ground cable of the battery in accordance with the exemplary embodiment.

As shown in FIGS. 18, 19 and 20, the ground cable G attaches to one side of the battery 50 (FIGS. 18 and 19) and curves around the back end of the battery 50 where the ground cable G attaches to a ground post $G_P$ mounted on a flange 54*e*. The flange 54*e* is part of and extends rearward from the top end 54*a* of the first member 54 of the structure 52. Since the first member 54 and the entire structure 52 is fixed to the floor structure 32, the flange 54*e* and the ground post $G_P$ are grounded to the vehicle 10. The ground post $G_P$ is also referred to as a ground terminal $G_P$. When the ground cable G is connected to the ground post $G_P$, the battery 50 is grounded relative to the vehicle 10. The various cables connecting the battery 50 to the battery circuit box 104 and that travel through the portions of the tunnel 44 complete the connection of the battery 50 to the vehicle 10. As is described further below, the ground cable G can be disconnected from the ground post $G_P$ when it is necessary to do so.

A description of the center console assembly 28 is now provided with reference to FIGS. 22-39.

Figure 22:
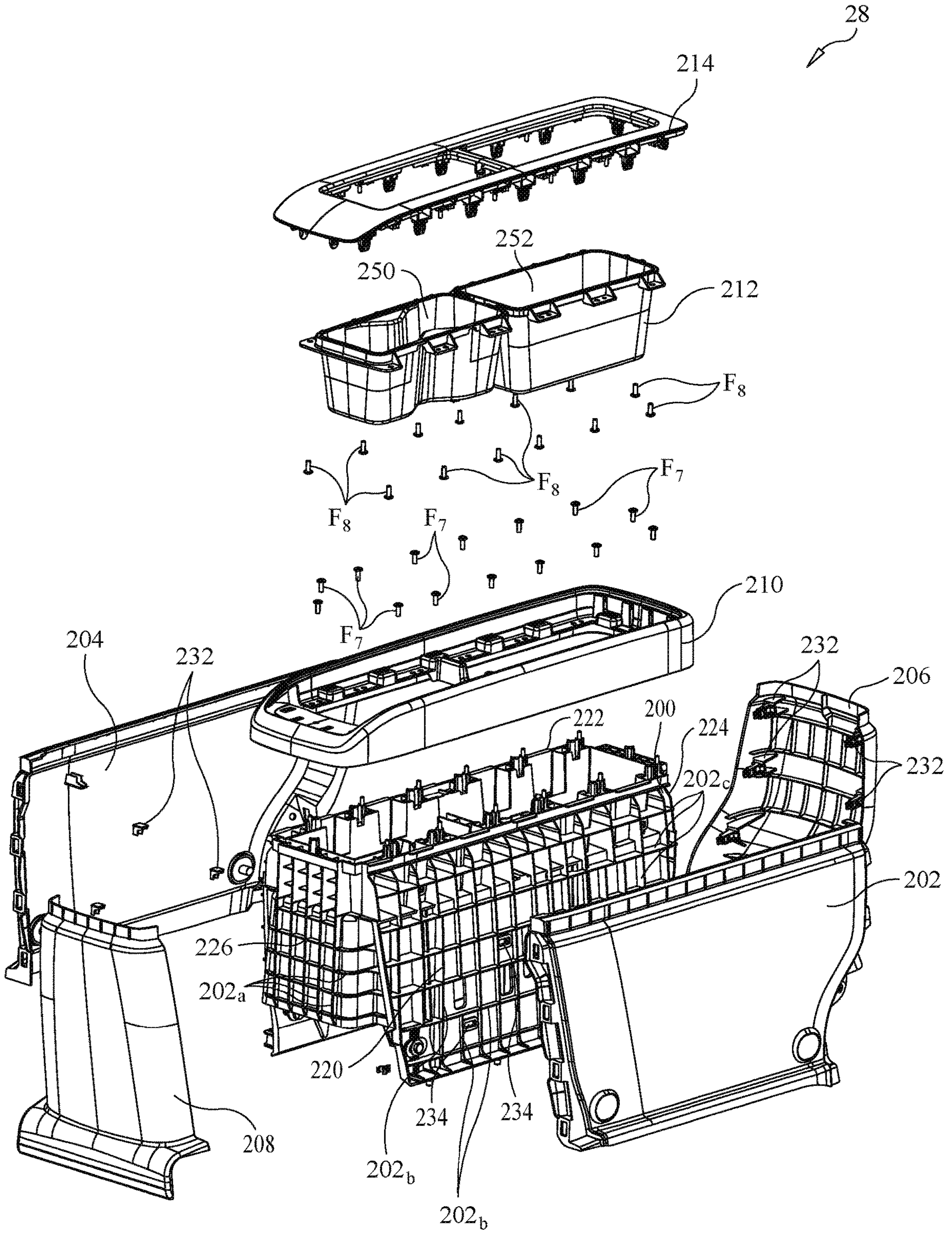
FIG. 22 is an exploded perspective view of the center console assembly showing a frame, first and second side panels, rear and forward panels, an upper member, a tray portion and an upper trim panel in accordance with the exemplary embodiment.

An exploded view of the center console assembly 28 is shown in FIG. 22. The center console assembly 28 basically includes a frame 200, first and second side panels 202 and 204, a rear panel 206, a forward panel 208, an upper member 210, a tray portion 212 and an upper trim panel 214.

Figure 4:
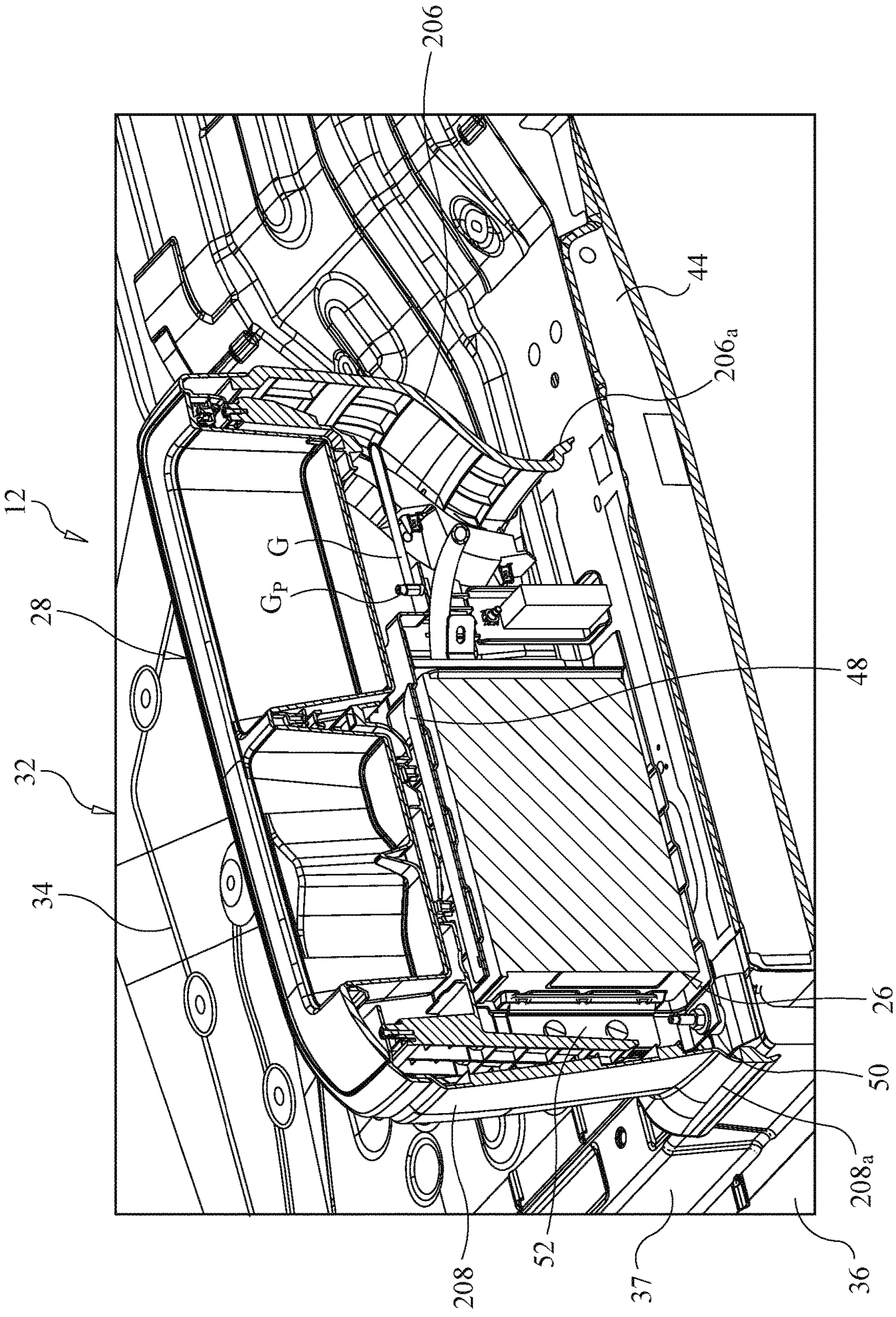
FIG. 4 is a cross-sectional view of the center console assembly depicted in FIG. 3 showing a battery case assembly with a battery receiving structure and a battery within a cavity defined by the center console assembly in accordance with the exemplary embodiment.

As shown in FIG. 22, the frame 200 has a first side wall 220, a second side wall 222, a rear wall 224, a front wall 226 and an upper section 228. The first side wall 220, the second side wall 222, the rear wall 224, the front wall 226 and the upper section 228 can be separate elements attached to one another, however in the depicted embodiment, the frame 200 is molded of a plastic and/or polymer material as a single homogeneous member. As shown in FIGS. 3-4, the cavity 48 is defined between the first side wall 202 and the second side wall 204 and between the rear and front walls 224 and 226.

The cavity 48 is dimensioned to cover and conceal the battery case assembly 26. More specifically, the battery 50 and the structure 52 (the battery retaining structure 52) are located within the cavity 48 and completely concealed within the cavity 48 when the center console assembly 28 is completely assembled and installed to the floor structure 32, as shown in FIGS. 2-4 and 25.

Figure 26:
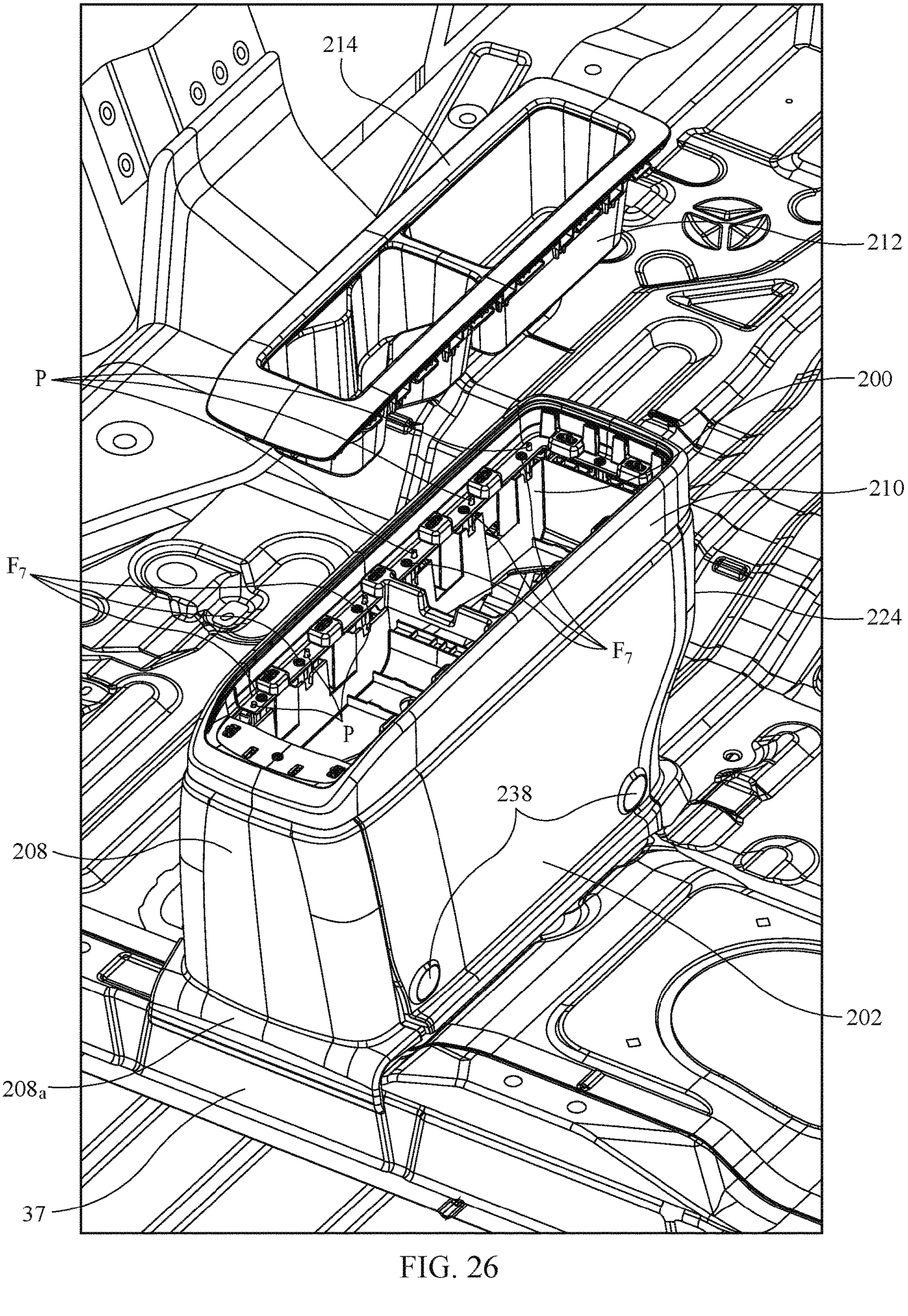
FIG. 26 is an exploded perspective view of the center console assembly showing the tray portion and the upper trim panel separated from the remainder of the center console assembly in accordance with the exemplary embodiment.
Figure 27:
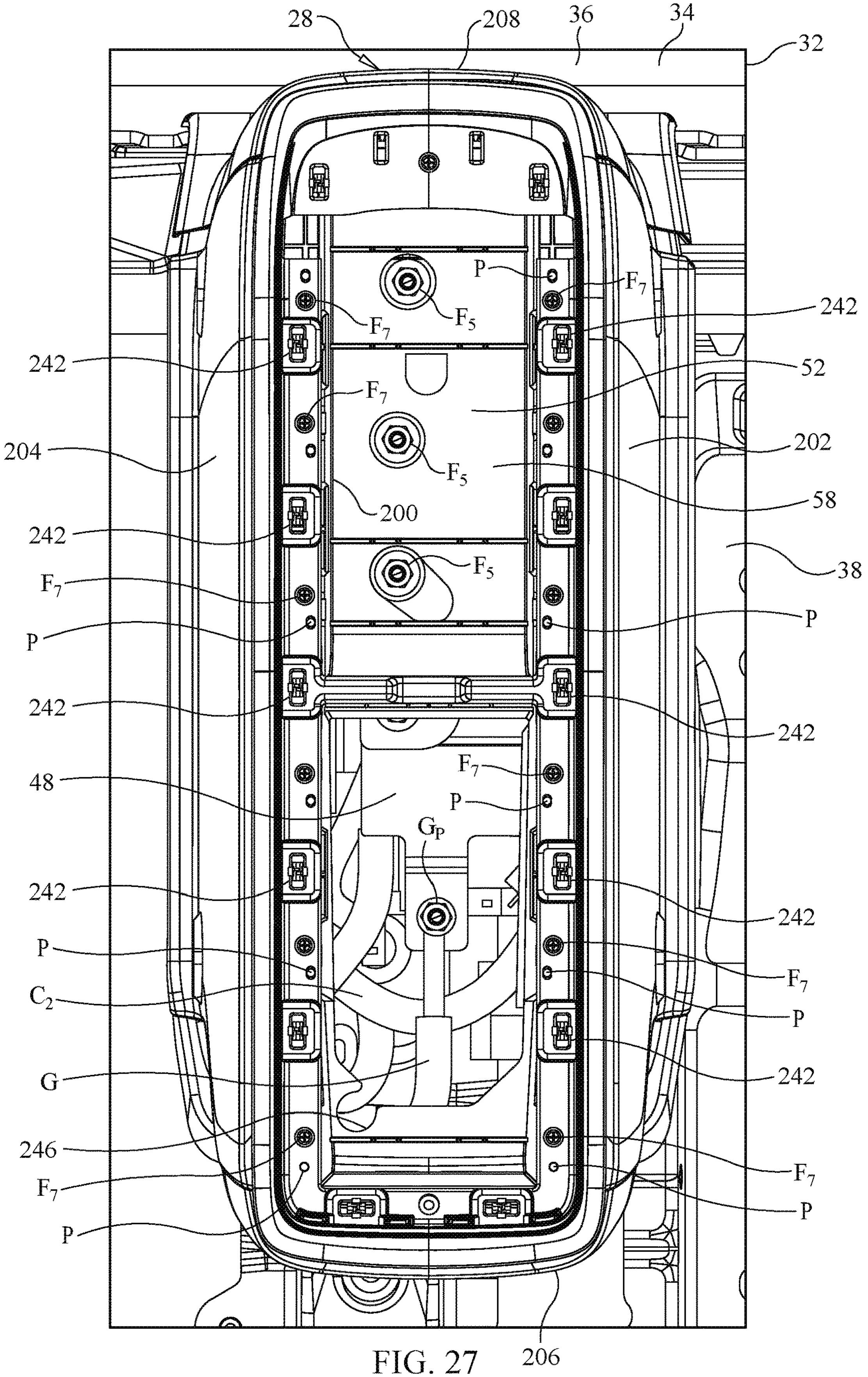
FIG. 27 is a top view of the center console assembly with the tray portion and the upper trim panel removed showing the battery and battery receiving structure visible through openings in the upper member of the center console assembly and further showing a ground cable from the battery and a ground terminal attached to the battery receiving structure, the upper member having a cable retaining portion that temporarily retains the battery ground cable when disconnected from the ground terminal in accordance with the exemplary embodiment.
Figure 28:
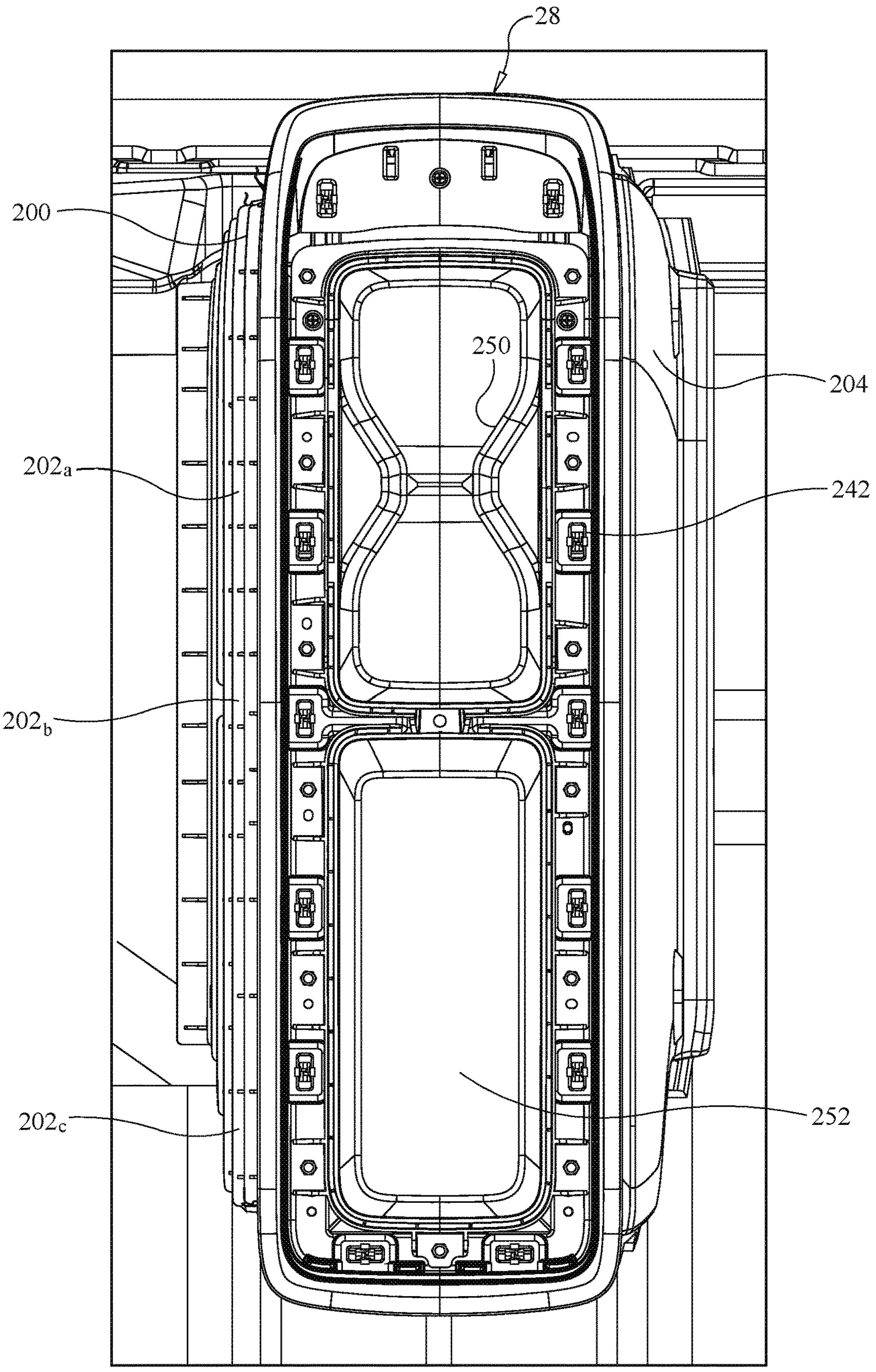
FIG. 28 is another top view of the center console assembly with the tray portion and the upper trim panel installed to the center console assembly covering and concealing the battery and battery receiving structure in accordance with the exemplary embodiment.

The frame 200 includes side walls and front and rear walls that are formed with ribs 202*a*, 202*b* and 202*c*. The ribs 202*a*, 202*b* and 202*c* are vertically oriented and horizontally oriented and provide the frame 200 with strength, in particular, compressive strength and rigidity. As shown in FIGS. 26 and 27, the frame 200 has an open top that exposes the cavity 48.

Figure 36:
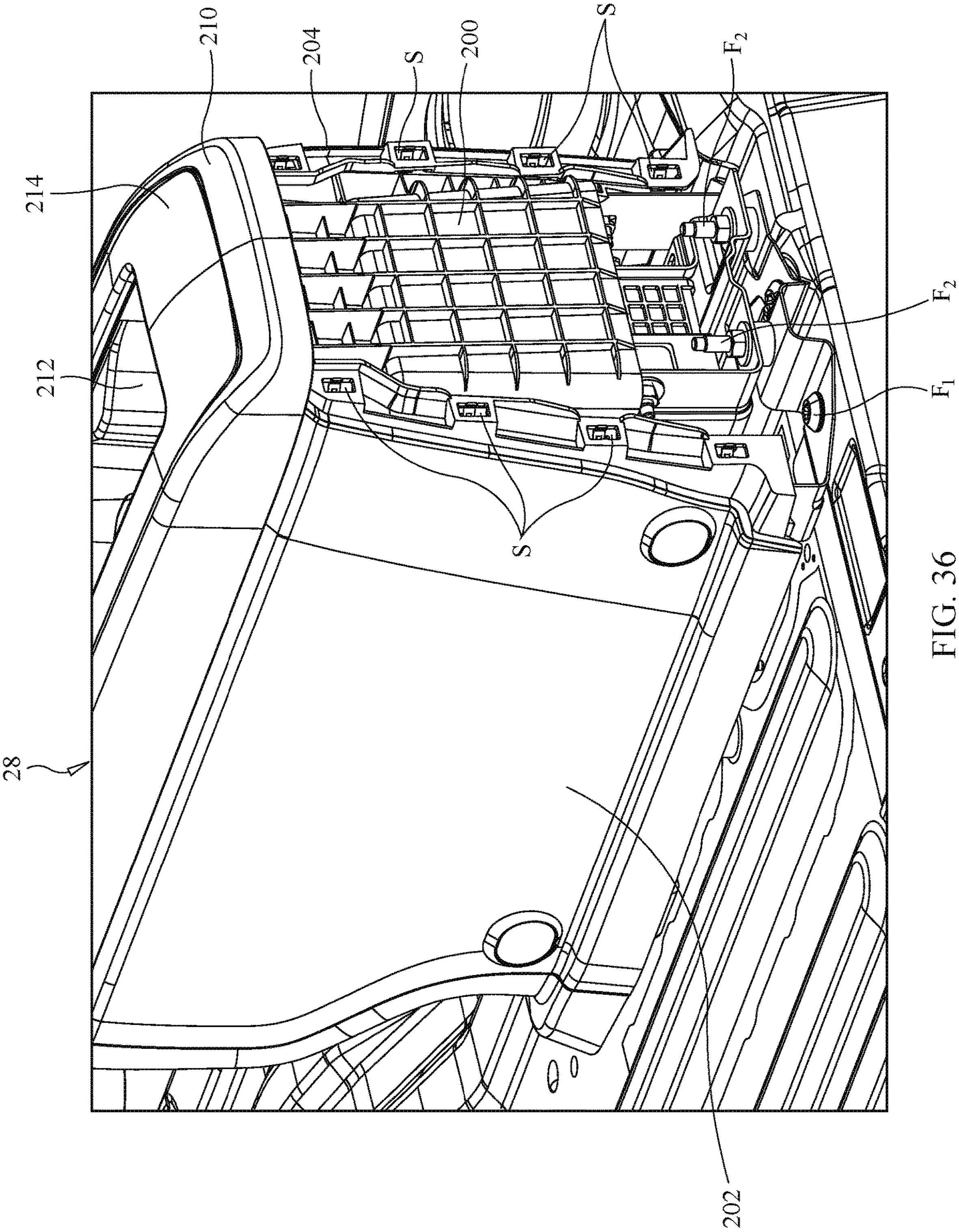
FIG. 36 is a rear perspective view of the center console assembly with the rear panel removed showing the stiffening and strengthening ribs of the frame and showing openings in the frame dimensioned to receive the snap-fitting projections of the rear panel that attach the rear panel to the frame in accordance with the exemplary embodiment.
Figure 37:
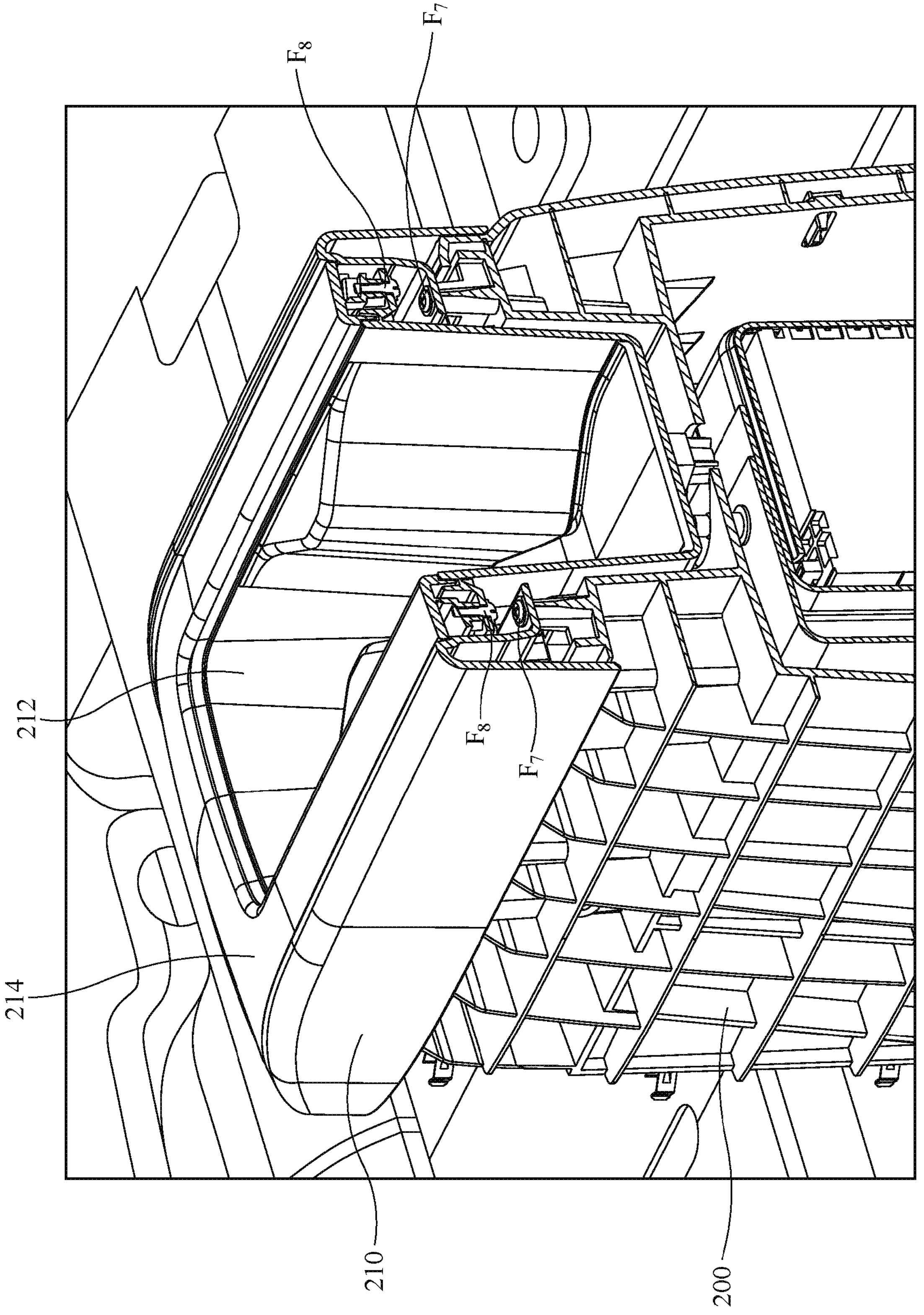
FIG. 37 is a rear perspective and cross-sectional view of the center console with one of the side panels removed showing the battery and battery receiving structure concealed within the cavity and further showing the fasteners fixing the upper member to the frame in accordance with the exemplary embodiment.
Figure 38:
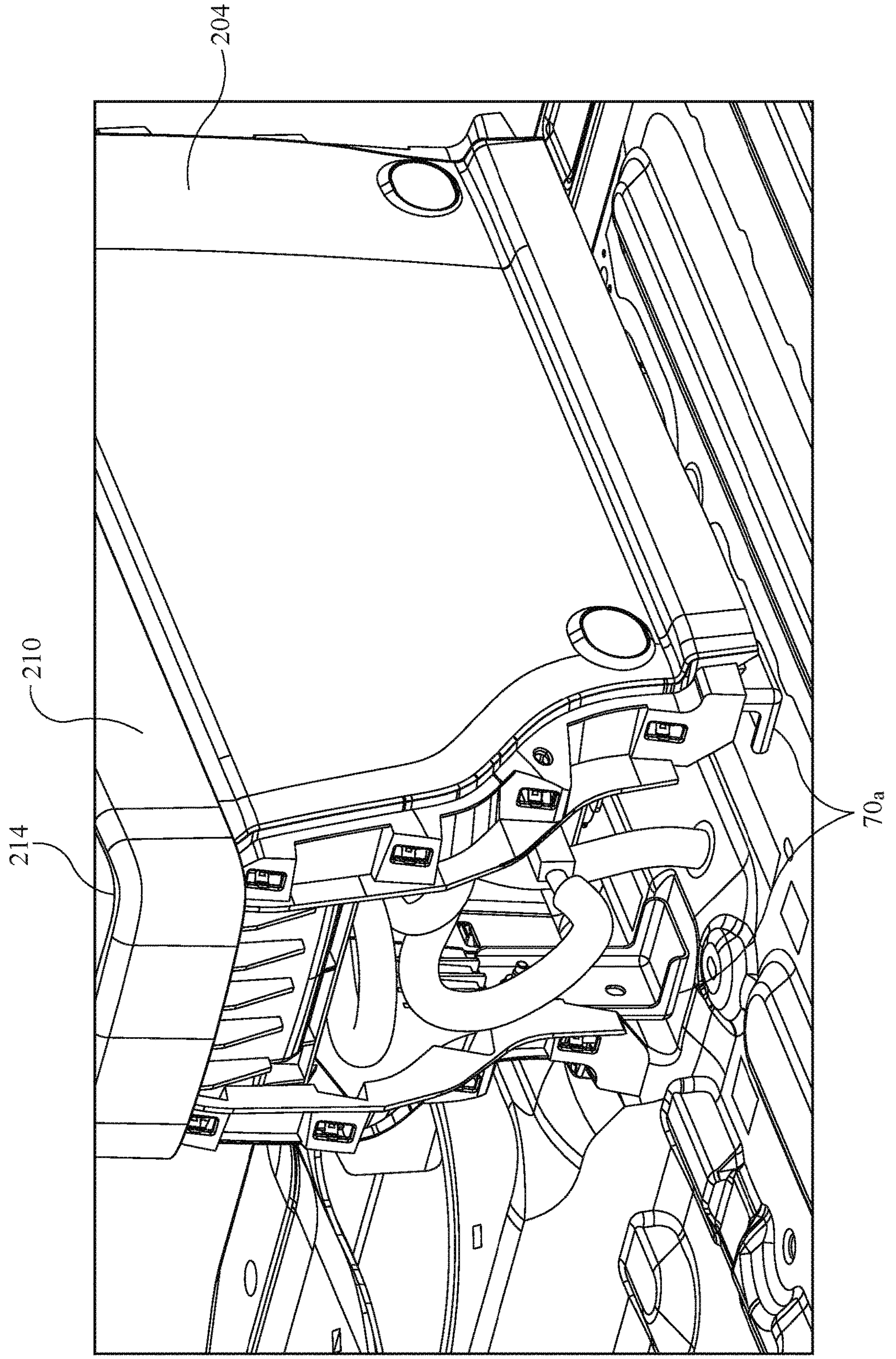
FIG. 38 is another rear perspective of the center console with the rear panel removed cables from the battery extending into openings in the floor structure and into a portion of the tunnel (not shown) in accordance with the exemplary embodiment.

The first and second side panels 202 and 204 have decorative or smooth exposed surfaces and hidden surfaces that include a plurality of snap-fitting projections 232. The snap-fitting projections 232 are dimensioned and positioned for insertion and snap-fitting into corresponding openings 234 in the frame 200, as shown in FIG. 22. Similarly, the rear panel 206 and the forward panel 208 have decorative or smooth exposed surfaces and hidden surfaces that include a plurality of snap-fitting projections 232 that snap-fit into corresponding openings in the frame 200. Since snap-fitting fastening structures such as the snap-fitting projections 232 are conventional features, further description is omitted for the sake of brevity. Openings S in the first and second side panels 202 and 204 for snap-fitting projections of the forward panel 208 are shown in FIG. 36. Openings S in the first and second side panels 202 and 204 for snap-fitting projections of the rear panel 206 are shown in FIG. 38.

The center console assembly 28 is assembled in the following manner. First the first side panel 202 and the second side panel 204 are snap-fitted to the frame 200. Thereafter, the rear panel 206 and the forward panel 208 are snap-fitted to the frame 200. Each of the rear panel 206 and the forward panel 208 have upright edges than overlap corresponding edges of the first and second side panels 202 and 204.

Any time after the first and second side panels 202 and 204 are attached to the frame 200, the center console assembly 28, the center console assembly 28 can be attached to the vehicle floor structure 32 as follows. First, the partially assembled center console assembly 28 is positioned over the battery case assembly 26 such that the first and second center console attachment flanges 80 and 82 mounting plate 70 are located outside of the frame 200 but covered by the first and second side panels 202 and 204. Similarly, at a rearward end of the center console assembly 28, is positioned such that the rear mounting plates 70*a* are positioned outside of the rear of the frame 200 but covered by the rear ends of the first and second side panels 202 and 204.

Alternatively, the frame 200 can be placed in position on the upper surface of the floor structure 32 and aligned between the first and second center console attachment flanges 80 and 82 mounting plate 70 and between the two mounting plates 70*a*. Thereafter the first and second side panels 202 and 204 and the rear and forward panels 206 and 208 can be attached to the frame 200.

Figure 23:
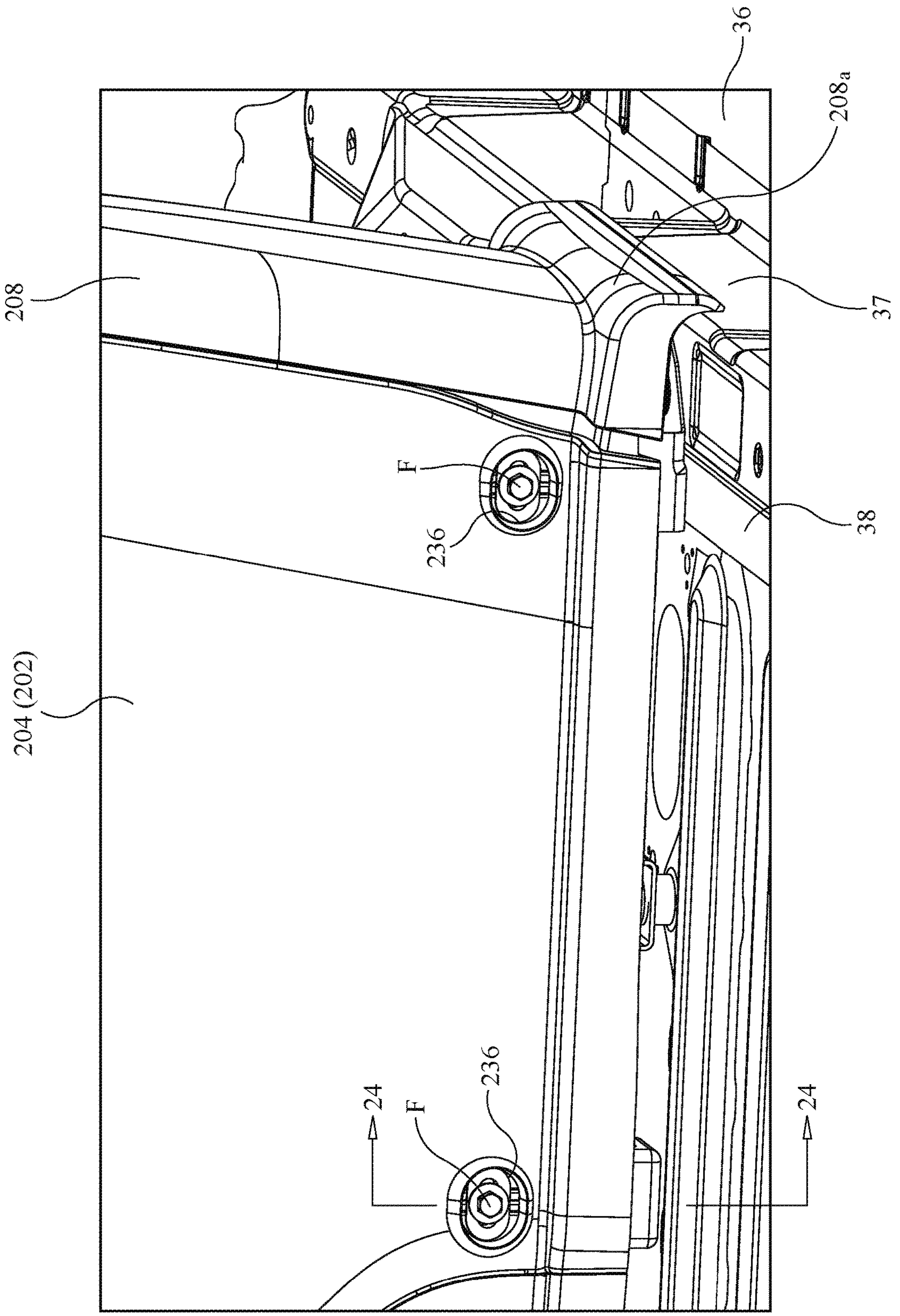
FIG. 23 is a side perspective view of the center console assembly showing openings in the one of the side panels for receiving a fastener that attaches the center console assembly to the mounting plate in accordance with the exemplary embodiment.
Figure 24:
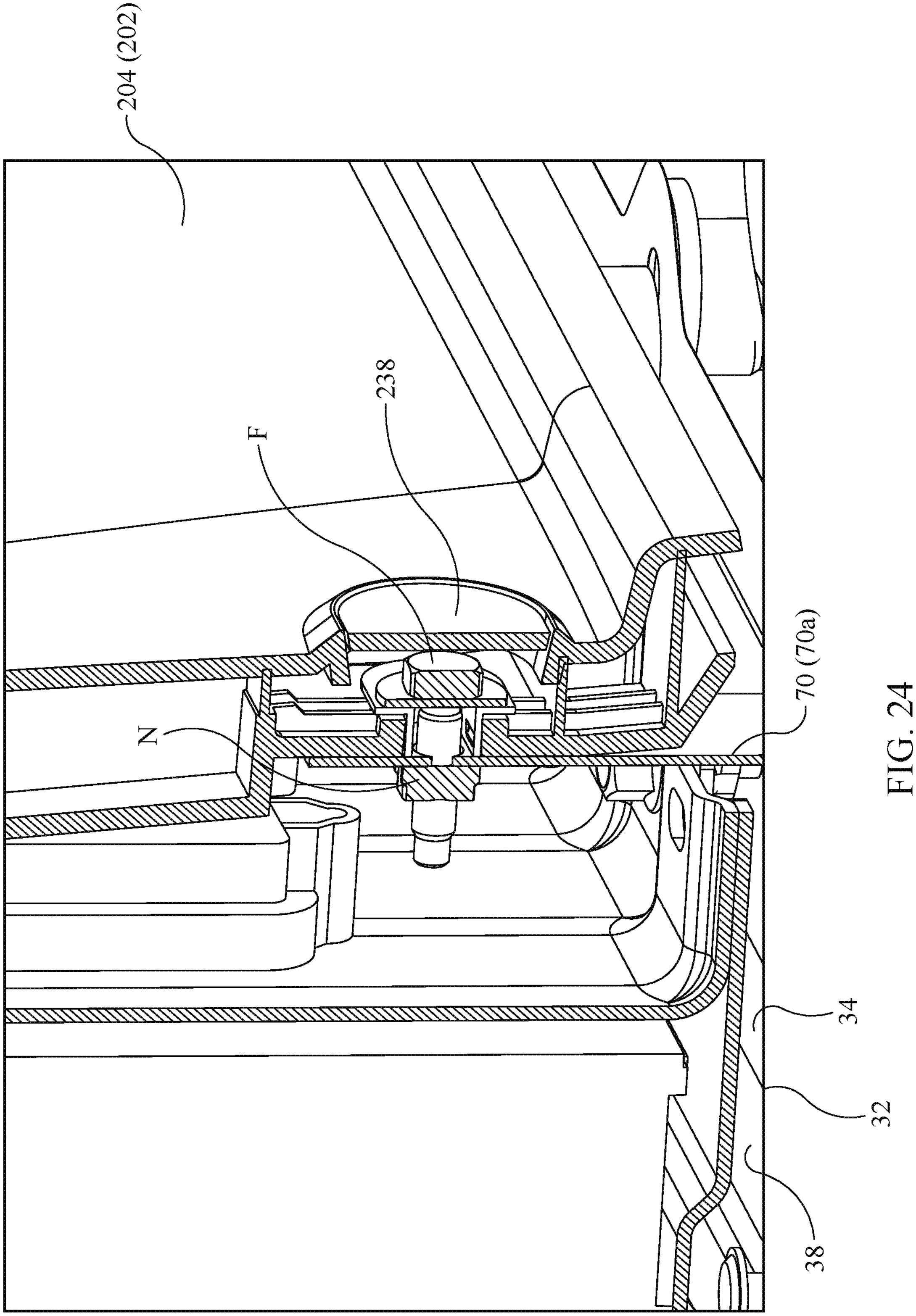
FIG. 24 is a cross-sectional perspective view of the center console assembly showing one of the fasteners installed through one of the openings and into the mounting plate in accordance with the exemplary embodiment.
Figure 25:
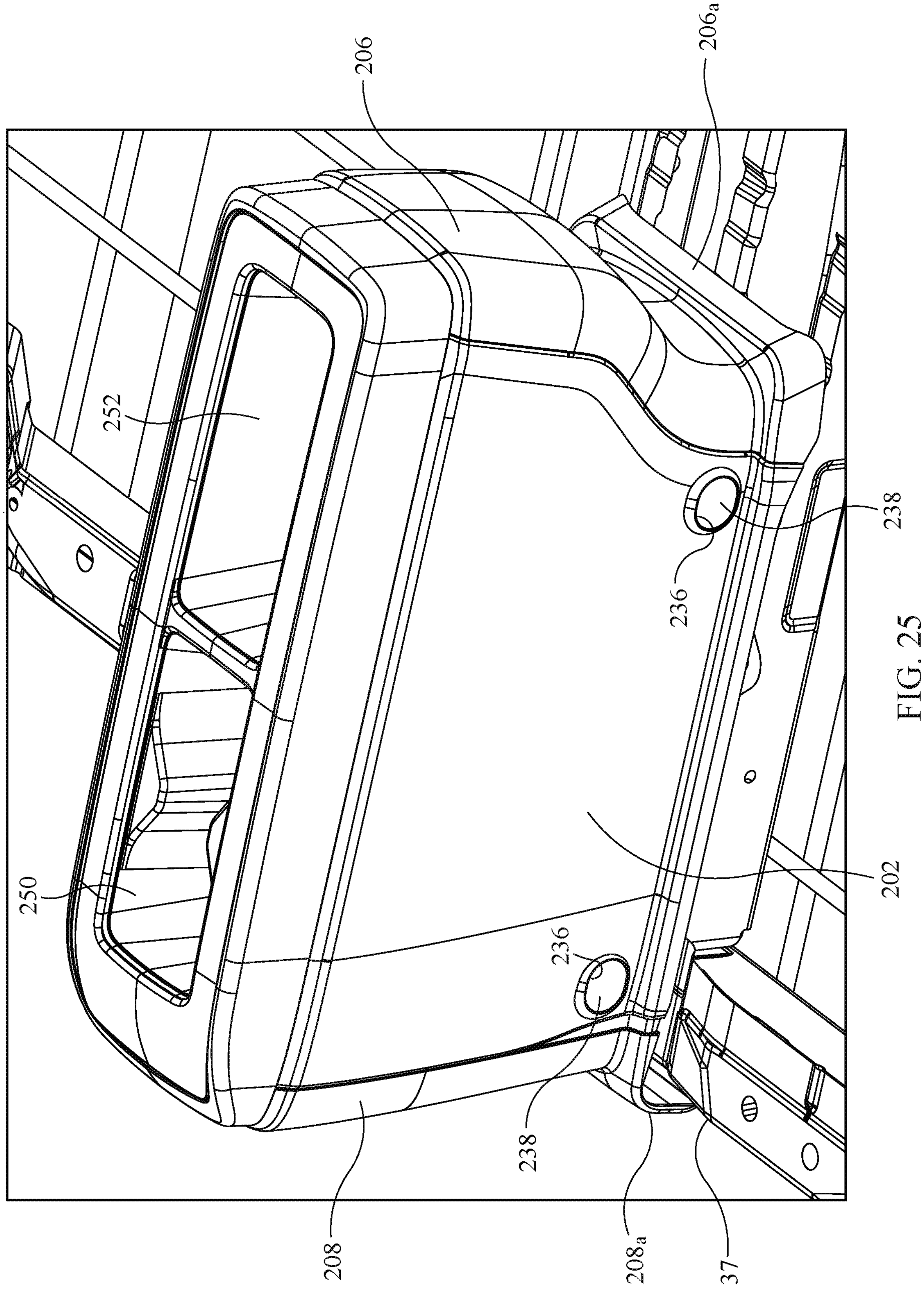
FIG. 25 is a perspective view of the center console assembly showing plugs inserted into the openings covering and concealing the fasteners attaching the center console assembly to the mounting plate in accordance with the exemplary embodiment.

Next, as shown in FIGS. 23 and 24, fasteners F are inserted through openings 236 near the bottom of the first and second side wall panels 202 and 204 and threaded into nuts N that are welded to respective ones of the first and second center console attachment flanges 80 and 82 mounting plate 70 and rear mounting plates 70*a*. Once the fasteners F are tightened to a predetermined torque, the center console assembly 28 is fixed in position to the upper surface 34 of the floor structure 32. As shown in FIG. 25, thereafter, plugs 238 are inserted into the openings 236 covering and concealing the fasteners F. The plugs 238 include decorative surfaces that match the decorative surfaces of the first and second side panels 202 and 204.

Next as shown in FIGS. 22, 26, 32-33 and 37, the upper member 210 is installed to the frame 200 via fasteners $F_7$. The outer perimeter of the upper member 210 covers upper edges of each of the first and second side panels 202 and 204, the rear panel 206 and the forward panel 208.

Figure 30:
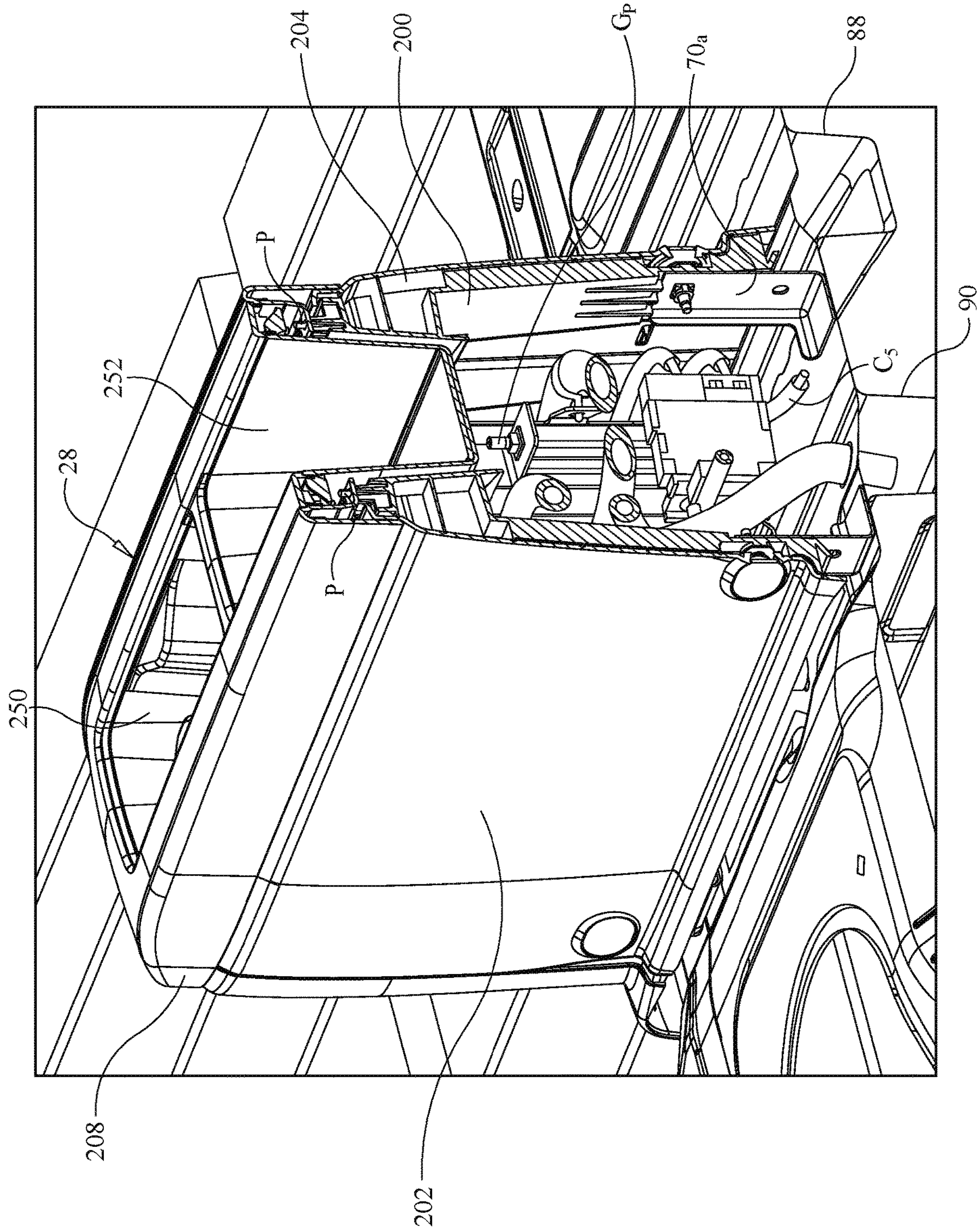
FIG. 30 is a rear perspective view of the center console assembly is a rear section of the center console assembly cut away showing the rear end of the battery receiving structure and the rear end of the battery including the ground terminal of the battery in accordance with the exemplary embodiment.
Figure 31:
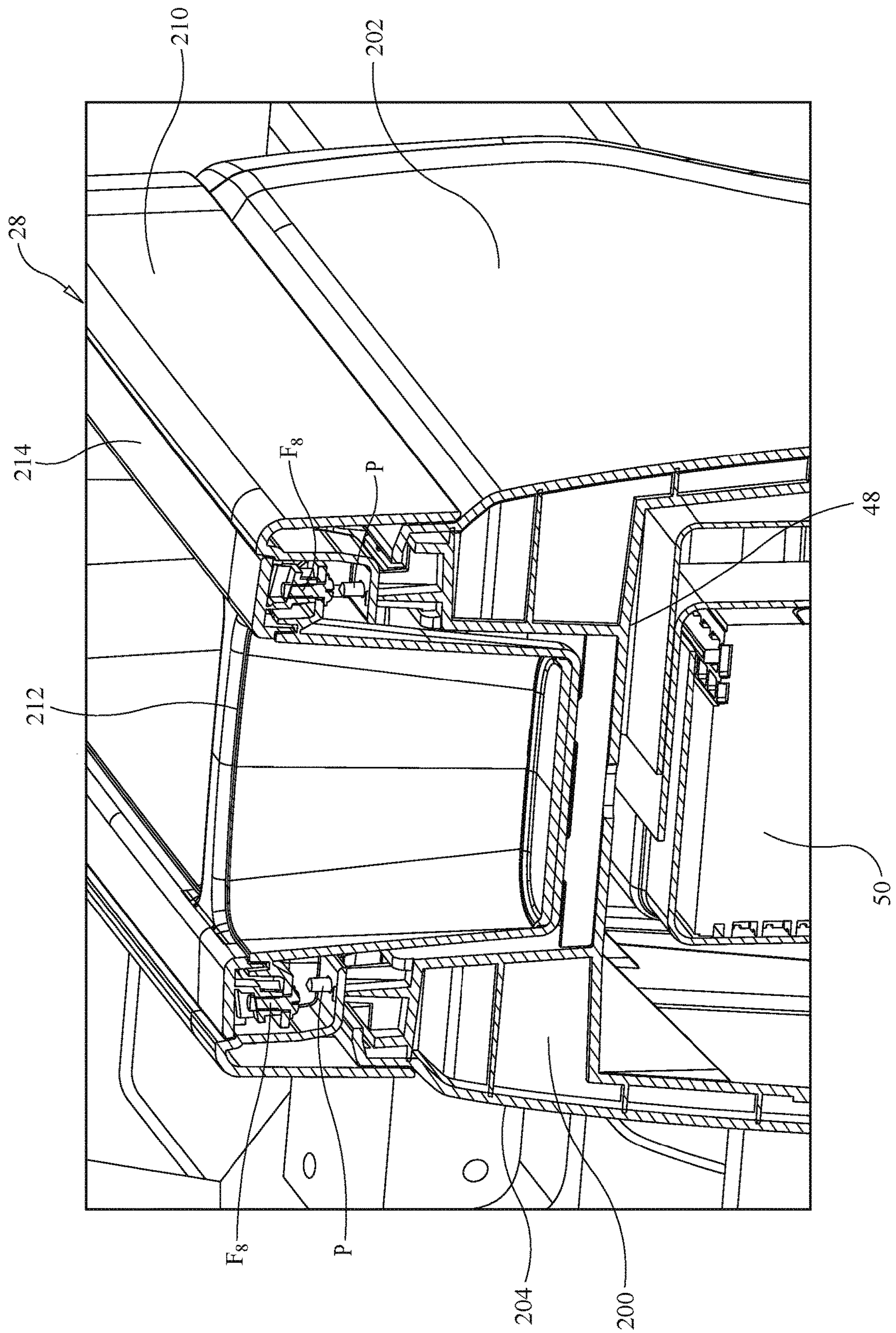
FIG. 31 is a cross-section front view of the center console assembly showing the cavity defined therein concealing the batter retaining structure and the battery and further showing alignment pins of the frame that fit into openings in the upper member aligning the upper member to the frame and showing fasteners that fix the tray portion to the upper trim panel in accordance with the exemplary embodiment.
Figure 32:
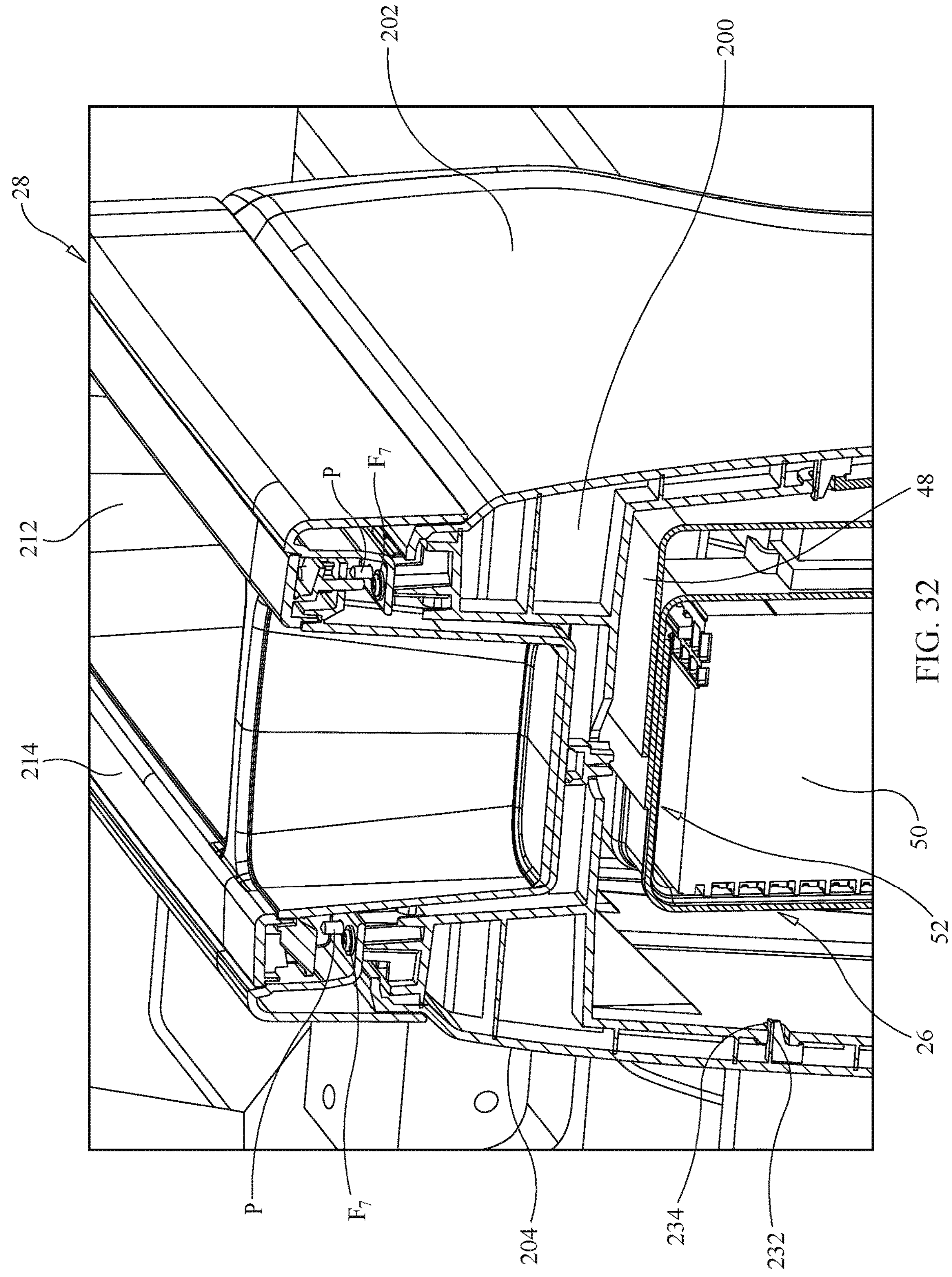
FIG. 32 is another cross-section front view of the center console assembly similar to FIG. 31 showing the cavity defined therein concealing the batter retaining structure and the battery and further showing fasteners that attach the upper member to the frame in accordance with the exemplary embodiment.
Figure 33:
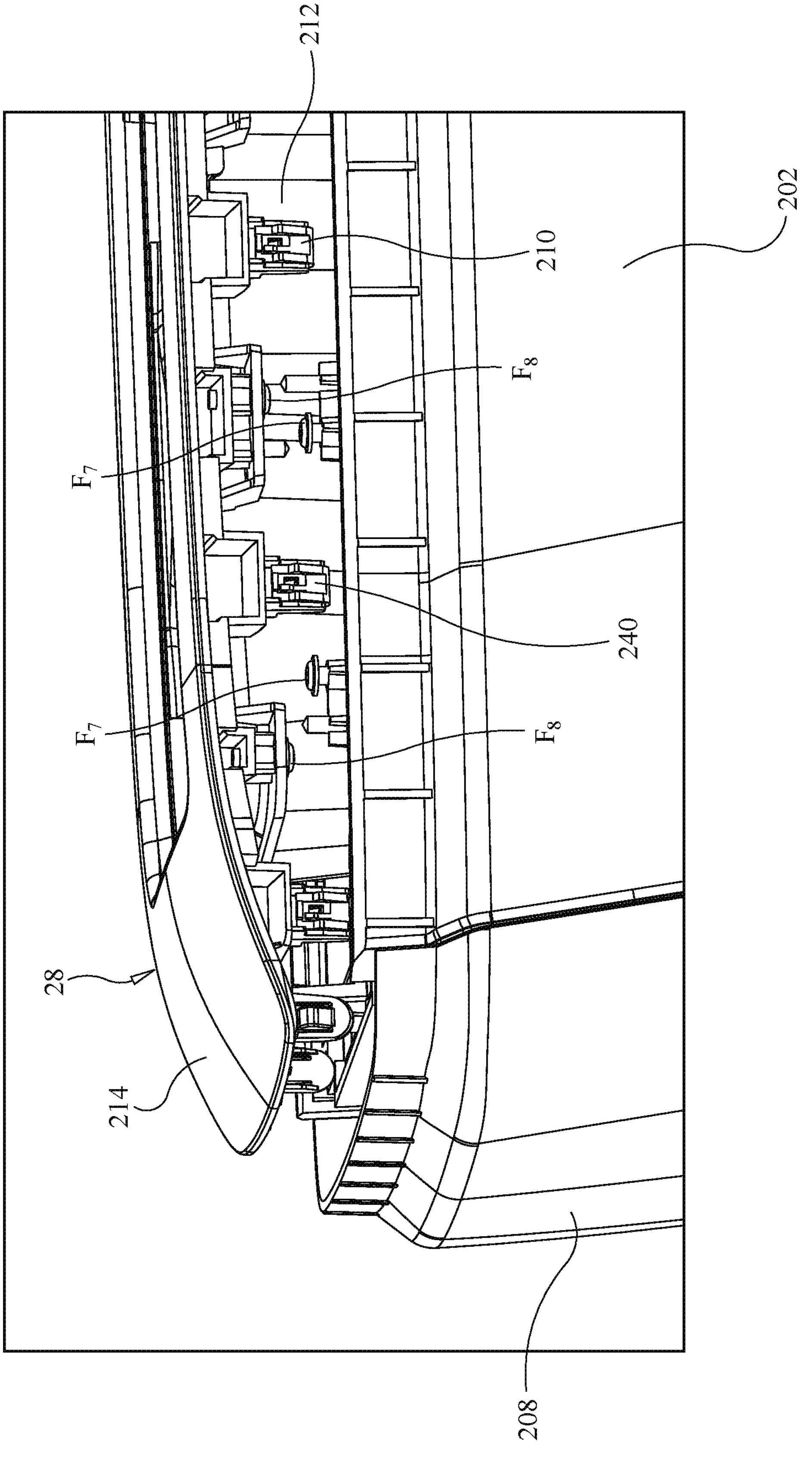
FIG. 33 is a perspective view of an upper half of the center console assembly with the upper member removed showing fasteners that attach the upper member (not shown) to the frame, showing the fasteners that attach the tray portion to the upper trim panel and showing snap-fitting projections that attach the tray portion and the upper trim panel to the upper member in accordance with the exemplary embodiment.

The upper member 210 has a central opening that corresponds with and allows access into the tray portion 212, as described below. An outer periphery of the upper member 210 includes a decorative surface corresponding to the remainder of the exterior surfaces of the center console assembly 28. The fasteners $F_7$ extend through openings in the upper member 210 and into openings in the frame 200, as shown in FIG. 32. As shown in FIGS. 26, 30 and 32, an upper periphery of the frame 200 includes alignment pins P that extend through corresponding alignment openings in the upper member 210.

Figure 34:
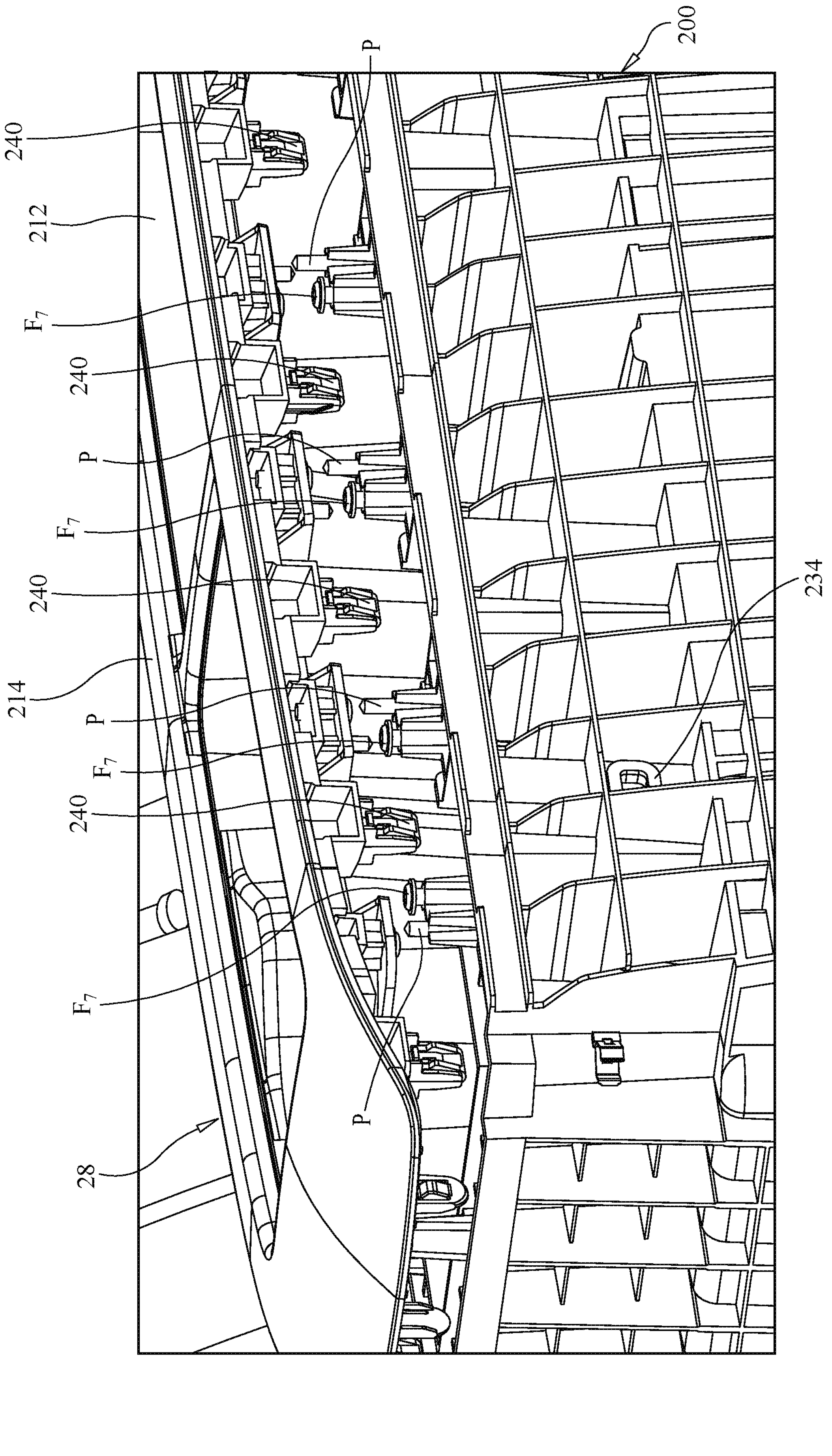
FIG. 34 is another perspective view of an upper half of the center console assembly with the upper member removed showing the fasteners mentioned above and further showing the stiffening and strengthening ribs of the frame in accordance with the exemplary embodiment.
Figure 35:
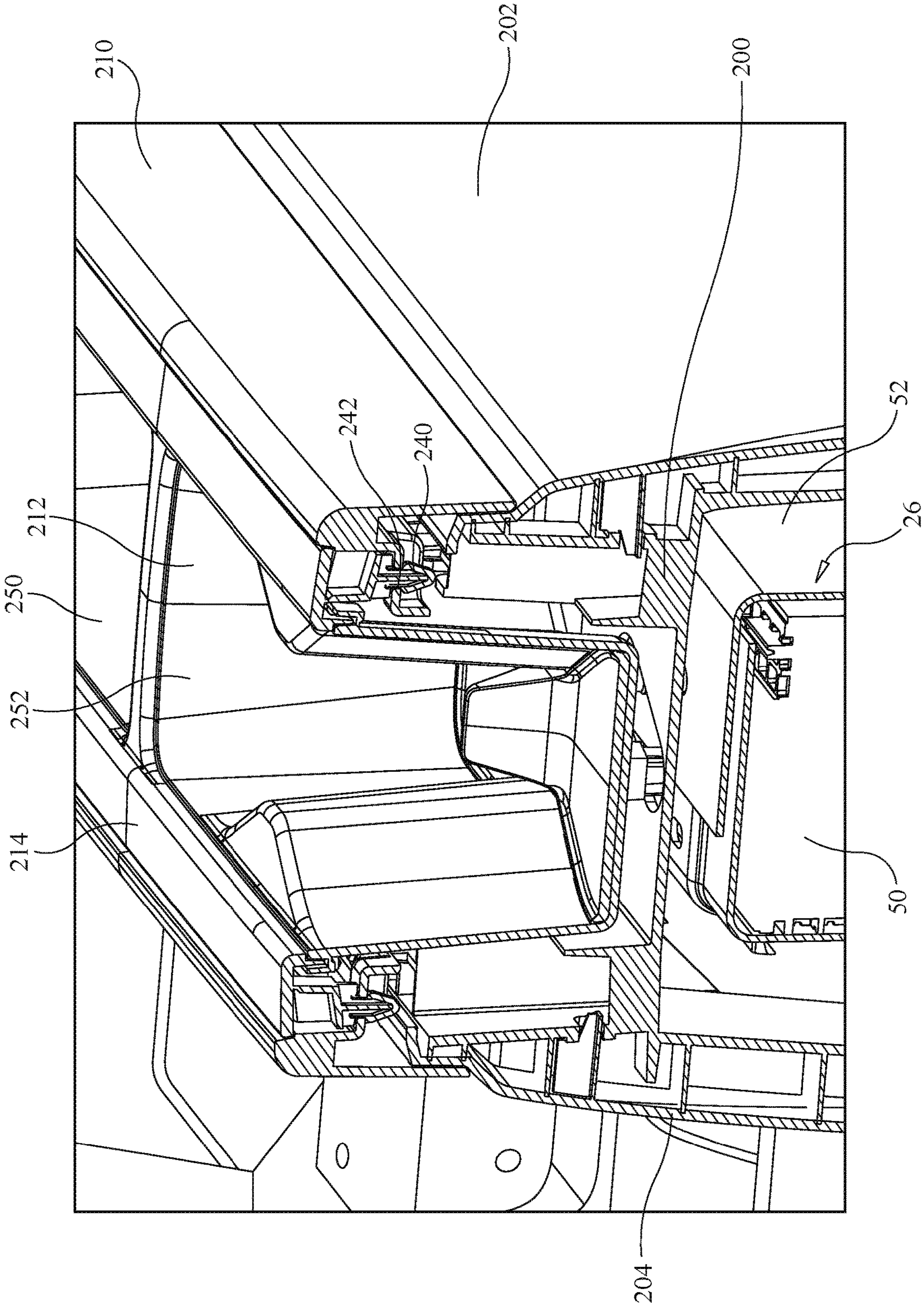
FIG. 35 is another cross-section front view of the center console assembly similar to FIGS. 31 and 32 showing the cavity defined therein concealing the batter retaining structure and the battery and further showing the snap-fitting projections that attach tray portion and the upper trim panel to the upper member in accordance with the exemplary embodiment.

As shown in FIGS. 22, 26, 31 and 37, the tray portion 212 attaches to the underside of the upper trim panel 214 via fasteners $F_8$. As shown in FIGS. 34 and 35, the tray portion 212 (and attached upper trim panel 214) attached to the upper member 210 via snap fitting projections 240 that extend and snap fit into openings 242 shown in FIGS. 27 and 28.

As shown in FIG. 27, the upper member 210 includes a circular shaped recess 246 hereinafter referred to as a cable retaining portion 246. As is shown in FIG. 27, with the tray portion 212 and the upper trim portion 214 removed from the center console assembly 28, the ground post $G_P$ and ground cable G are visible and easily accessed. The area visible through the rear opening where the ground post $G_P$ and ground cable G are visible is referred to as a ground connection area of the battery 50.

During assembly of the vehicle 10, after the battery 50 and the center console assembly 28 have been installed to the vehicle 10, the tray portion 212 and upper trim panel 214 are left off of the center console assembly 28. Further, prior to attachment to the ground post $G_P$, the ground cable G is retained in the cable retaining portion 246. When ready, the ground cable G is then connected to the ground post $G_P$ thereby completing the connection of the battery 50 to the vehicle 10. During maintenance of the vehicle 10, it may be necessary to disconnect the battery 50 from the vehicle 10. In such a circumstance, the tray portion 212 and the upper trim panel 214 can be removed from the center console assembly 28 such that the ground cable G is easily accessed. The ground cable G is disconnected from the ground post $G_P$ and inserted into the cable retaining portion 246 while the vehicle 10 undergoes maintenance. When maintenance is completed, the ground cable G is reattached to the ground post $G_P$ and the tray portion 212 and the upper trim panel 214 are reinstalled to the center console assembly 28.

The tray portion 212 includes a cup retaining portion 250 and a storage tray portion 252. As is shown by comparing FIGS. 27-28 and 30, the storage tray portion 252 covers and conceals the ground cable G is reattached to the ground post $G_P$ with the tray portion 212 and the upper trim panel 214 installed.

As shown in FIGS. 23 and 25, a lower end of the forward panel 208 includes a downwardly extending lip 208*a*. The floor structure 32 includes a stepped area defined by a cross member 37. The cross-member 37 extends from a first lateral side of the vehicle body structure 12 to a second lateral side of the vehicle body structure 12, reinforcing the floor structure 32. The cross member 37 is located between the front seat area 36 and the second-row seat area 38 such that the second-row seat area 38 is several inches higher that the front seat area 36. The downwardly extending lip 208*a* has a slight curvature that corresponds to the curvature of an upper portion of the cross-member 37. The cross member 37 is connected to the battery receiving structure 52 further supports the battery receiving structure 52 and the battery 50.

Figure 29:
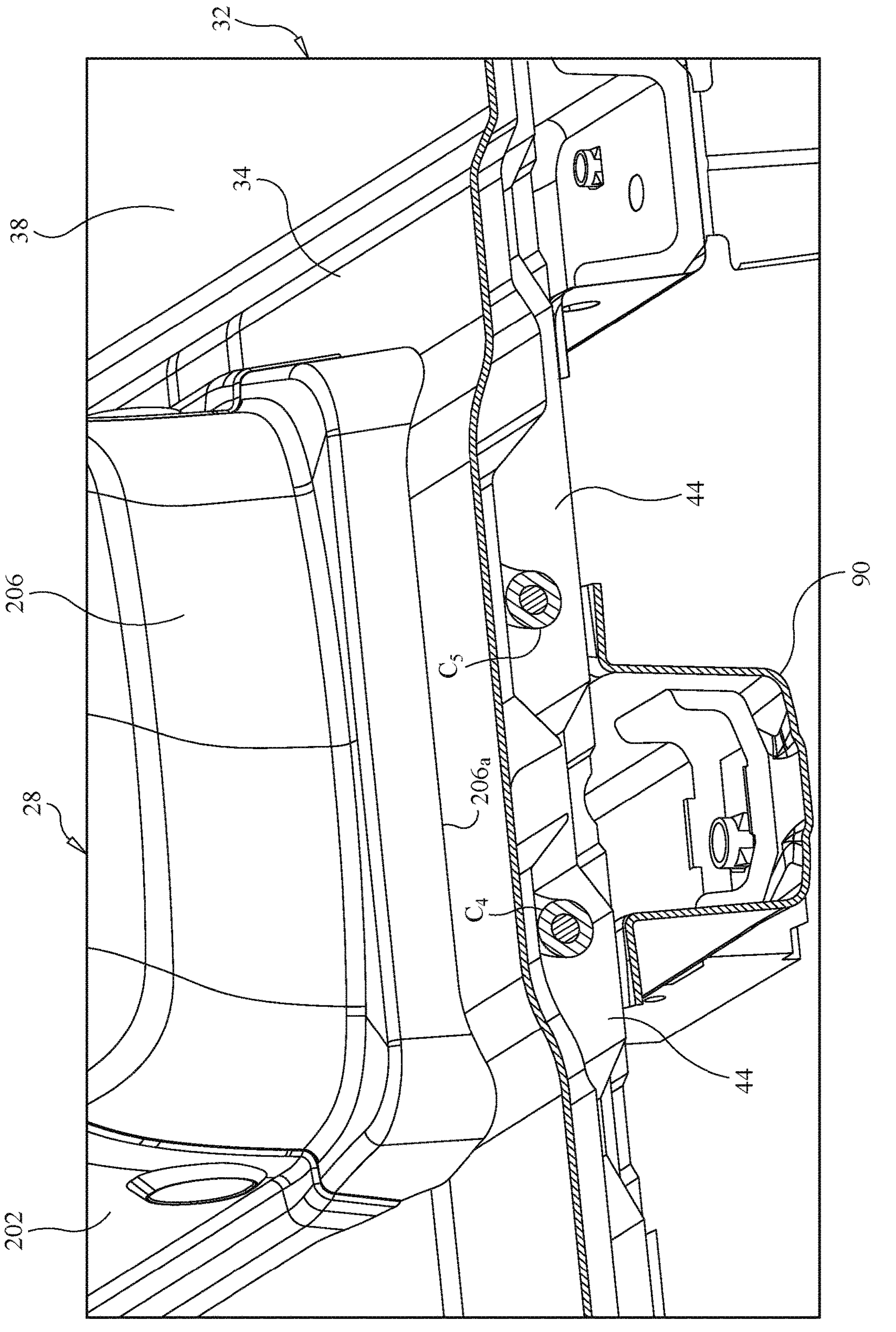
FIG. 29 is a rear perspective view of the center console assembly showing cables extending beneath the top panel of the floor structure and through a portion of the tunnel with the rear panel of the center console assembly having a curved recess or bottom edge that conforms to the shape of a portion of the top panel of the floor structure above the tunnel accordance with the exemplary embodiment.

As shown in FIG. 29, a lower rear edge of the rear panel 206 includes a recessed area 206*a* in order to conform to an adjacent portion of the floor structure 32 that conceals a portion of the tunnel 44. Specifically, cables $C_4$ and $C_5$ extend rearward and downward into respective portions of the tunnel 44.

Location of the battery 50 is chosen so that the battery 50 is well protected in the event of an impact event and protected from most of not all types of deformation of the vehicle body structure in the event of an impact event.

The various elements and components of the vehicle body structure not described above are conventional components that are well known in the art. Since such elements and components are well known in the art, these structures will not be discussed or illustrated in detail herein. Rather, it will be apparent to those skilled in the art from this disclosure that the components can be any type of structure that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment (s), the following directional terms "forward", "rearward", "above", "downward", "vertical", "horizontal", "below" and "transverse" as well as any other similar directional terms refer to those directions of a vehicle equipped with the battery case assembly. Accordingly, these terms, as utilized to describe the present invention should be interpreted relative to a vehicle equipped with the battery case assembly.

The terms of degree such as "substantially". "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A battery case assembly, comprising a vehicle floor structure;

a first member formed from a single first panel having a bottom portion, an upright portion and a top portion, the bottom portion being fixedly attached to the vehicle floor structure;

a second member formed from a single second panel and being attached to the first member such that the first member and the second member define a hollow rectangular structure with the bottom portion, the upright portion and the top portion defining three sides of the hollow rectangular structure and an upright section of the second member defining a fourth side of the hollow rectangular structure, the hollow rectangular structure having an open forward end and an open rearward end; and a battery fitted within the hollow rectangular structure such that forward end of the battery is exposed via the open forward end of the hollow rectangular structure and a rearward end of the battery is exposed via the open rearward end of the hollow rectangular structure, the top portion of the hollow rectangular structure completely covering a top portion of the battery.

2. The battery case assembly according to claim 1, wherein the bottom portion, the upright portion and the top portion of the first member define an overall C-shape as viewed from a front end thereof.

3. The battery case assembly according to claim 1, wherein the first panel is formed of a metal, and the bottom portion, the upright portion and the top portion of the first member are formed from the single first panel as a homogenous, unitary, single element.

4. The battery case assembly according to claim 2, wherein the second member includes the upright section, a top section and a bottom section that together define a Z-shape as viewed from front end thereof.

5. The battery case assembly according to claim 4, wherein the second panel is formed of a metal, and the upright section, the top section and the bottom section of the second member are formed from the single second panel as a homogenous, unitary, single element.

6. The battery case assembly according to claim 1, wherein the second member includes the upright section, a top section and a bottom section that together define a Z-shape as viewed from front end thereof.

7. The battery case assembly according to claim 6, wherein the vehicle floor structure includes an upper surface with the first member being attached to a portion of the upper surface.

8. The battery case assembly according to claim 7, wherein the vehicle floor structure includes a tunnel that extends beneath an upper surface of the vehicle floor structure at a location adjacent to the first member.

9. The battery case assembly according to claim 8, wherein the battery includes a cable attached to a rearward end of the battery, with the cable extending through an opening in the upper surface of the vehicle floor structure and into the tunnel.

10. The battery case assembly according to claim 1, wherein the first member is removably attached to the vehicle floor structure at a front end thereof and a rear end thereof.

11. The battery case assembly according to claim 10, wherein the front end of the first member is attached via mechanical fasteners to a mounting plate having an overall U-shape, and the mounting plate is attached to the vehicle floor structure via mechanical fasteners proximate the front end of the first member.

12. The battery case assembly according to claim 11, wherein the mounting plate includes at least one center console attachment flange.

13. The battery case assembly according to claim 12, wherein the mounting plate includes a first flat portion, a rib portion, a contoured portion and a second flat portion, all formed with the at least one center console attachment flange as a single monolithic, unitary single element.

14. The battery case assembly according to claim 13, wherein the first flat portion of the mounting plate includes an opening for a first fastener that attaches the mounting plate to the vehicle floor structure, the rib portion includes a second fastener provided for attachment to the first member, the contoured portion includes an opening for a third fastener that attaches the mounting plate to the vehicle floor structure and the second flat portion includes a fourth fastener provided for attachment to the first member.

15. The battery case assembly according to claim 1, further comprising a third member having an upright part and a horizontal part, the upright being configured to retain a battery circuit box between the upright part and the second member, and the horizontal part being removably fixed to a top section of the second part via mechanical fasteners.

16. The battery case assembly according to claim 1, wherein the vehicle floor structure includes an upper surface with the first member being attached to a portion of the upper surface.

17. The battery case assembly according to claim 16, wherein the vehicle floor structure includes a tunnel that extends beneath an upper surface of the vehicle floor structure at a location adjacent to the first member.

18. The battery case assembly according to claim 17, wherein the battery includes a cable attached to a rearward end of the battery, with the cable extending through an opening in the upper surface of the vehicle floor structure and into the tunnel.

19. A battery case assembly, comprising a vehicle floor structure;

a first member having a bottom portion, an upright portion and a top portion, the bottom portion being fixedly attached to the vehicle floor structure;

a second member attached to the first member such that the first member and the second member define a hollow rectangular structure with the bottom portion, the upright portion and the top portion defining three sides of the hollow rectangular structure and an upright section of the second member defining a fourth side of the hollow rectangular structure, the hollow rectangular structure having an open forward end and an open rearward end;

a third member having an upright part and a horizontal part, the upright being configured to retain a battery circuit box between the upright part and the second member, and the horizontal part being removably fixed to a top section of the second part via mechanical fasteners; and a battery fitted within the hollow rectangular structure such that forward end of the battery is exposed via the open forward end of the hollow rectangular structure and a rearward end of the battery is exposed via the open rearward end of the hollow rectangular structure.

* * * * *